(12) United States Patent
Higgins et al.

(10) Patent No.: US 8,886,482 B2
(45) Date of Patent: Nov. 11, 2014

(54) PREDICTIVE AND INTERNET-BASED SAMPLER CONTROL

(75) Inventors: Timothy Alan Higgins, Fort Collins, CO (US); Ajit Kumar Ananthapadmanabhan, Fort Collins, CO (US)

(73) Assignee: Hach Company, Loveland, CO (US)

( * ) Notice: Subject to any disclaimer, the term of this patent is extended or adjusted under 35 U.S.C. 154(b) by 371 days.

(21) Appl. No.: 13/154,519

(22) Filed: Jun. 7, 2011

(65) Prior Publication Data

US 2011/0307203 A1 Dec. 15, 2011

Related U.S. Application Data

(60) Provisional application No. 61/397,361, filed on Jun. 10, 2010.

(51) Int. Cl.
| | |
|---|---|
| G01N 37/00 | (2006.01) |
| G01V 9/00 | (2006.01) |
| G08B 21/00 | (2006.01) |
| G05B 15/02 | (2006.01) |

(52) U.S. Cl.
CPC .................................. *G05B 15/02* (2013.01)
USPC ............................. 702/84; 702/2; 340/870.16

(58) Field of Classification Search
USPC .............. 702/188, 183, 84, 1, 2, 81; 709/203; 340/870.16
See application file for complete search history.

(56) References Cited

U.S. PATENT DOCUMENTS

| | | | |
|---|---|---|---|
| 3,719,081 A | 3/1973 | Lynn et al. | |
| 4,650,562 A | 3/1987 | Harman, III et al. | |
| 4,830,757 A * | 5/1989 | Lynch et al. | 210/742 |
| 5,315,880 A | 5/1994 | Bailey | |
| 5,506,791 A | 4/1996 | Hungerford et al. | |
| 5,544,531 A | 8/1996 | Heckman | |
| 5,633,809 A | 5/1997 | Wissenbach et al. | |
| 5,644,088 A | 7/1997 | Heckman | |
| 5,646,863 A * | 7/1997 | Morton | 702/23 |
| 5,691,914 A | 11/1997 | Randolph | |
| 5,811,688 A | 9/1998 | Marsh et al. | |
| 6,208,943 B1 | 3/2001 | Randolph et al. | |
| 6,356,205 B1 * | 3/2002 | Salvo et al. | 340/853.3 |
| 6,560,543 B2 * | 5/2003 | Wolfe et al. | 702/22 |
| 6,954,701 B2 * | 10/2005 | Wolfe | 702/22 |
| 7,711,523 B2 | 5/2010 | Linley et al. | |
| 8,410,931 B2 * | 4/2013 | Petite et al. | 340/540 |
| 2002/0130069 A1 * | 9/2002 | Moskoff | 210/85 |
| 2003/0168391 A1 * | 9/2003 | Tveiten | 210/188 |
| 2008/0234939 A1 * | 9/2008 | Foot et al. | 702/12 |
| 2009/0216594 A1 * | 8/2009 | Verhey et al. | 705/8 |

FOREIGN PATENT DOCUMENTS

| | | |
|---|---|---|
| JP | 2005-56102 | 3/2005 |
| KR | 2001-0079486 | 8/2001 |
| KR | 2003-0066073 | 8/2003 |
| KR | 10-2006-0087797 | 8/2006 |

* cited by examiner

*Primary Examiner* — Sujoy Kundu
*Assistant Examiner* — Ricky Ngon
(74) *Attorney, Agent, or Firm* — Ference & Associates LLC

(57) ABSTRACT

Described is a system for remotely monitoring water quality at one or more locations via a web-enabled application. Embodiments of the present invention provide remote water sampler control with integrated predictive sampling. In some embodiments, the present invention provides a web-hosted application that allows for remote user control of one or more water samplers in combination with predictive sampling.

13 Claims, 4 Drawing Sheets

PREDICTIVE AND INTERNET-BASED SAMPLER CONTROL

CROSS-REFERENCE TO RELATED APPLICATIONS

This application claims priority of U.S. Provisional Application No. 61/397,361, entitled "New Blind Logger Sample Trigger & Control Via Web Hosted Application" filed Jun. 10, 2010, the entire contents and disclosure of which are incorporated herein by reference.

FIELD OF THE INVENTION

The present invention relates to a system for remotely monitoring water quality.

BACKGROUND

Systems for monitoring the characteristics of water sources is critical to many industries. For example, such monitoring is required for many regulatory agencies such as the EPA and FDA. Often, water sources that are of interest are located in remote locations that are difficult to access by humans. Therefore, water monitoring is done by means of automated collection of samples by a sampler device. Automated remote sampling of water sources allows for sampling of water sources at varying times and locations. Traditionally, the remotely located samplers are delivered to their installed sites with a predetermined schedule for monitoring. For example, in one such water quality monitoring system a sampler may be installed at a remote Mississippi tributary with a preset sampling schedule of one sample every 12 hours. But there are several drawbacks to systems of this type. For example, one drawback is that the preset sampling schedule may need to be modified. Also, accessing the remote site may be difficult and expensive. In addition, the person performing the installation is often a contractor to the environmental engineer and, therefore, does not have the authority to make on-site modifications to the sampling parameters of the monitoring system.

SUMMARY

According to a first broad aspect of the present invention, there is provided a system comprising: a plurality of sets of environmental instruments located at a plurality of respective locations, each set of environmental instruments comprising one or more environmental instruments at one of the respective locations, one or more visual display devices for displaying environmental data from the selected one or more environmental instruments, one or more servers in wireless communication with the plurality of sets of environmental instruments and the one or more visual display devices, wherein each of the environmental instruments measure water quality for a water stream at the location of the environmental instrument, and wherein the plurality of sets of environmental instruments comprise a first environmental instrument at a first location, a second environmental instrument at a second location, and a third environmental instrument at the first location, wherein the first environmental instrument controls the second environmental instrument based on water quality measured by the first environmental instrument or the third environmental instrument, wherein the plurality of environmental instruments are in communication with the one or more visual display devices via the one or more servers, wherein the one or more servers comprise a web-enabled application for displaying water quality data measured by the plurality of sets of environmental instruments on the one or more visual display devices, wherein the one or more visual display devices are each located remotely with respect to the plurality of sets of environmental instruments, and wherein the one or more servers are located remotely from the plurality of sets of environmental instruments and the one or more visual display devices.

According to a second broad aspect of the present invention there is provided a method comprising the following steps: (a) providing one or more environmental instruments at a first location that measure water quality for a first water stream at the first location and one or more environmental instruments at a second location that measure water quality for a second water stream at the second location, and (b) the one or more environmental instruments at the first location controlling the one or more environmental instruments at the second location based on water quality measured by the one or more environmental instruments at the first location.

According to a third broad aspect of the present invention there is provided a system comprising: one or more samplers located at one or more respective locations for measuring water quality at each of the respective locations, one or more visual display devices located remotely with respect to the one or more samplers, one or more servers in wireless communication with the samplers and the one or more visual display devices, wherein the one or more servers are located remotely with respect to the one or more samplers and the one or more visual display devices, wherein the one or more samplers is in communication with the one or more visual display devices via the one or more servers, and wherein the one or more servers comprise a web-enabled application for displaying water quality data measured by one or more samplers on a web browser on the one or more visual display devices.

BRIEF DESCRIPTION OF THE DRAWINGS

The accompanying drawings illustrate exemplary embodiments of the invention, and, together with the general description given above and the detailed description given below, serve to explain the features of the invention. The figures are not necessarily to scale, and some features may be exaggerated to show details of particular components. Therefore, specific details disclosed herein are not to be interpreted as limiting, but merely as a basis for the claims and as a representative basis for teaching one skilled in the art to variously employ the present invention. As a result, the invention is not limited to the specific examples described below, but only by the claims and their equivalents.

DETAILED DESCRIPTION

Definitions

Figure 1:
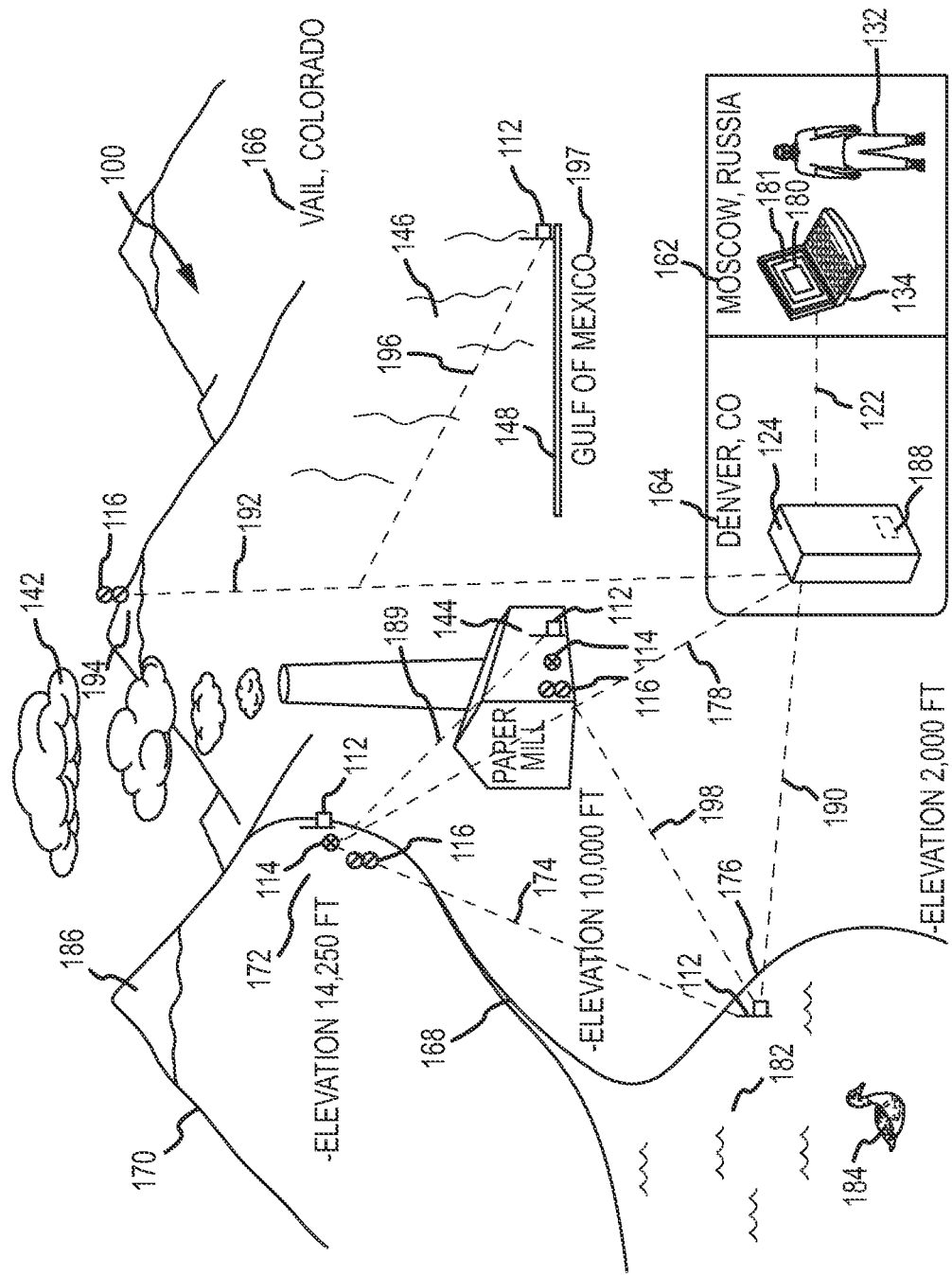
FIG. 1 is a schematic diagram illustrating a water quality monitoring system according to one embodiment of the present invention.

Where the definition of a term departs from the commonly used meaning of the term, applicant intends to utilize the definition provided below, unless specifically indicated.

For purposes of the present invention, it should be noted that the singular forms, "a," "an," and "the" include reference to the plural unless the context as herein presented clearly indicates otherwise.

For purposes of the present invention, directional terms such as "top," "bottom," "upper," "lower," "above," "below," "left," "right," "horizontal," "vertical," "up," "down," etc. are used merely for convenience in describing the various embodiments of the present invention. The embodiments of the present invention may be oriented in various ways. For example, the diagrams, apparatuses, etc. shown in the drawing figures may be flipped over, rotated by 90° in any direction, reversed, etc. For example, rows and/or columns may be oriented in any direction.

For purposes of the present invention, a value or property is "based" on a particular value, property, the satisfaction of a condition, or other factor, if that value is derived by performing a mathematical calculation or logical decision using that value, property or other factor.

For purposes of the present invention, the term "analysis report" refers to any organized presentation of data, raw data or historical data, manipulated data, observational data, information, analysis result, etc., based on data obtained or collected from one or more sensors and that is generated or manipulated by an analyzer on an environmental instrument and/or server. An analysis report may be prepared for any intended recipient, such as an elected official, manager or operator of a water treatment system, customer, member of the public, etc. According to some embodiments of the present invention, an "analysis report" may be a submission to a regulatory and/or law enforcement agency in any required format.

For purposes of the present invention, the term "analysis result" refers to any information, value, relationship, product, etc., created by aggregation, calculation, algorithm, analysis, manipulation, etc., of data or information obtained or collected from one or more sensors as performed by an analyzer on the environmental instrument and/or the server of the present remote water quality monitoring system. For example, an "analysis result" may include observational data analyzed, manipulated, etc., by an environmental instrument.

For purposes of the present invention, the term "analyzer" refers to a portion of an environmental instrument, such as a sampler or logger, or a portion of a server in which may be stored one or more software programs or other routines, firmware and/or hardware, which may analyze, manipulate, etc., data such as raw data, observational data, historical data or any other information obtained from one or more environmental instruments. According to some embodiments of the present invention, an analyzer may analyze or manipulate the data to generate the output. The analyzer may comprise a source code or a software program. According to some embodiments of the present invention, the analyzer may compare the data continuously, in real-time, at periodic or selected intervals, on condition or on demand by a user. According to some embodiments of the present invention, the output may comprise one or more of the following: data, alarm, analysis result or analysis report.

For purposes of the present invention, the term "data" refers to any information, reading, measurement, value, etc., ultimately obtained from one or more sensors or derived from such data. The term "data" includes any data or information, including raw data obtained directly from one or more sensors without manipulation, historical data earlier obtained from one or more sensors or entered or derived from data obtained at an earlier point or period in time, and analyzed or manipulated data, such as data or information manipulated, analyzed, etc., by an analyzer. The term "data" may include, for example, an analysis result or observational data.

For purposes of the present invention, the term "database" refers to a device or apparatus of the present remote water quality monitoring system used to store data, raw data, historical data, manipulated data and/or information in a logical or ordered arrangement or configuration. The database may be either part of the server or separate from the server, albeit connected to or in communication with the server.

For purposes of the present invention, the term "distant" in reference to a server and/or server database refers to the server and/or server database being physically separated from an environmental instrument or remote user. The term "distant" may refer to a server and/or server database that is connected with or linked to one or more environmental instruments and one or more remote users only via a wireless communication system.

For purposes of the present invention, the term "electronic control system" refers to a portion of a water treatment system that may control the operation of equipment and operation of a water treatment system. According to some embodiments of the present invention, a server of the present invention may access or collect data from one or more sensors via an electronic control system. An electronic control system may include an in-house supervisory control and data acquisition system (SCADA) or a programmable logic controller (PLC).

For purposes of the present invention, the term "environmental instrument" refers to a sampler, a logger, or a sensor or any other device that is used in the process of monitoring water.

For purposes of the present invention, the term "hardware and/or software" refers to functions that may be performed by digital software, digital hardware or a combination of both digital hardware and digital software. For example, a "program" may be a software program, a program that is part of the digital hardware of a computer or environmental instrument, or a combination of both digital hardware and digital software.

For purposes of the present invention, the term "interactive visual display device" refers to a visual display device that a user may interact with by means of an input device. The input device may be a touchscreen of the visual display device, a touchpad, a mouse, a trackball, a keyboard, etc. Examples of interactive visual display devices include a computer with a monitor, a laptop computer, a tablet computer, a cell phone, a smartphone, etc.

For purposes of the present invention, the term "logger" or "data logger" refers to a device that records data. An example of a logger is a water flow logger that records the water flow of a water source.

For purposes of the present invention, the term "mode of communication" and the term "communication link" refer to any suitable technology or device known and available in the art for communicating between two or more devices. A mode of communication may be achieved or carried out through any suitable medium, such as any wired or wireless connections as well as any protocols, including, but not limited to: the Internet; GMR (Geo-Mobile Radio); TCP/IP; MODBUS RTU, MODBUS ASCII, and MODBUS TCP; XML; Ethernet; file transfer protocol (FTP); Bluetooth®; ZigBee®; e-mail, such as SMTP; cellular modems; cellular phone networks, such as CDMA and TDMA; radio signals or remote terminal units (RTU) coupled to radio frequency transmitters; satellite transmission; SDI-12; existing telephone or communication networks or wiring; a standard Public Switched Telephone Network (PSTN); dial-up using landline or telephone; a wireless network such as Wi-Fi; a wide area network (WAN); a wireless local area network (WLAN); a local area network (LAN) or a metropolitan area network (MAN); a cable Internet connection; short message system (SMS); dial-up modem; a point-to-point link; global system for mobile communications (GSM, 3GSM), general packet radio services (GPRS), evolution-data optimized (EV-DO), enhanced data rates for GSM evolution (EDGE), digital enhanced cordless telecommunications (DECT), integrated digital enhanced network (iDEN), universal mobile telecommunications systems (UMTS) or advanced mobile phone systems (AMPS); or any other means for communicating between two or more devices known to those skilled in the art. The exact mode of communication may vary depending on the circumstances. According to some embodiments of the present invention, a communication link may be used to transmit and/or receive communications between two or more devices continuously, in real-time, at periodic or selected intervals, on condition or on demand by a user or by one or more of the two or more devices.

For purposes of the present invention, the term "observational data" refers to data or information that has been analyzed, manipulated, etc., by the environmental instrument, such as by an analyzer on the environmental instrument, from raw data or information obtained from one or more sensors prior to being transmitted to a server and/or server database.

For purposes of the present invention, the term "output" refers to any product, publication, submission, uploaded content, etc., including any information, data, analysis result, analysis report, etc., that may be communicated from the server of the present remote water quality monitoring system to a remote viewing device in a format suitable for display by the remote viewing device to a user.

For purposes of the present invention, the term "output device" refers to any device or apparatus known in the art that may be used by a user to view or that makes a user aware of an output of the water quality monitoring system, such as, for example, personal computers or terminals, servers, etc., as well as a variety of handheld personal communications equipment, such as cell phones, pagers, PDAs, BlackBerrys®, Palm® devices, iPhones®, etc.

For purposes of the present invention, the term "processor" refers to a single processing device or a group of inter-operational processing devices. Some examples of processors are computers, integrated circuits, logic circuitry, etc.

For purposes of the present invention, the term "remotely located" and the term "remote" refer to instruments being physically isolated except for direct collaboration with each other or indirect interaction through a website such as FSDATA™.

For purposes of the present invention, the term "remote user" refers to a user that is remotely located from one or more environmental instruments of a water quality monitoring system according to an embodiment of the present invention.

For purposes of the present invention, the term "remote water quality monitoring system" refers to a system for remotely monitoring the operation and equipment of a remotely located water treatment system or the water quality in, toward or from a remotely located water treatment system using sensors to collect data that is transmitted to a server for analysis, manipulation and communication to a remote viewing device for a user.

For purposes of the present invention, the term "sampler" refers to a device that draws predefined liquid volumes based on a set of rules. The set of rules may be preset for the sampler or defined in a sample program for the sampler by a user. Examples of samplers include Hach sd900™, American Sigma 900Max™, etc.

For purposes of the present invention, the term "sensor" and the term "water quality sensor" refer to a device, probe or apparatus for the detection or measurement of parameters or values relevant to water quality, such as values for water flow including water level, flow velocity, etc. The term "sensor" may refer to a device, probe or apparatus connected to an environmental instrument, such as a logger.

For purposes of the present invention, the term "server" refers to one or more computers with which environmental instruments and remote visual display devices communicate. In one embodiment of the present invention, a server may include three server components: a communication server interfaces with the logger or sampler, a web server to provide the user interface, and a database server to store data collected by the communication server from a logger of a sampler. The server computer may collect, assemble, aggregate, manipulate, or analyze data from one or more sensors of the present remote water quality monitoring system prior to the data being transmitted to the server of the present remote water quality monitoring system. The "server" may be any computer able to (1) at least temporarily store, collect, assemble, aggregate, etc., data from one or more sensors and (2) transmit data or information to a server (or a server database associated with the server) via a mode of communication. Thus, a "server" may contain or include (1) one or more memory devices to store, collect, assemble, aggregate, etc., the data at least temporarily, (2) one or more ports or inputs for receiving data or information either directly or indirectly from one or more sensors, and (3) one or more transmission interfaces to transmit data or information to a server. Also, a "server" may have the ability to process, manipulate, analyze, etc., the data obtained from the one or more sensors, such as by an analyzer or software located on the environmental instrument, prior to transmission of data or information to the server and/or server database. A "server" may be a web or Internet server. The "server" may further include a database and/or an analyzer.

For purposes of the present invention, the term "server database" refers to a device or apparatus of the present remote water quality monitoring system used to store data, raw data, historical data, manipulated data and/or information, such as in a logical or ordered arrangement or configuration. The server database may be part of the server or separate, albeit connected to or in communication with the server. As such, the "server database" is physically separated, i.e., at a remote or distant location, from the location of the environmental instruments and the remote users of a remote water quality monitoring system.

For purposes of the present invention, the term "set of environmental instruments" refers to the one or more environmental instruments at a particular location. A set of environmental instruments may comprise a single sampler, logger or sensor or may comprise a combination of one or more samplers, one or more loggers and/or one or more sensors.

For purposes of the present invention, the term "transmission interface" refers to a portion of an environmental instrument, electronic control system and/or one or more sensors of a remote water quality monitoring system that is capable of transmitting data or information to a server via any suitable wireless mode of communication.

For purposes of the present invention, the terms "treat," "treated," "treating," "treatment," and the like shall refer to any process, treatment, generation, production, discharge or other operation that may be performed by a water treatment system on, or in relation to, the water in the water treatment system.

For purposes of the present invention, the term "user" refers to a person, entity or agency that views data, information, analysis results or analysis reports communicated from the server to the remote viewing device of the present remote water quality monitoring system.

For purposes of the present invention, the term "user control module" refers to hardware and/or software that may be used by a user to control a remotely located environmental instrument such as a sampler, a logger, a sensor, etc.

For purposes of the present invention, the terms "visual display device" and "visual display apparatus" include any type of visual display device or apparatus such as a CRT monitor, LCD screen, LEDs, projected display, printer for printing out an image such as a picture and/or text, etc. A visual display device may be a part of another device such as a computer monitor, television, projector, cell phone, smartphone, laptop computer, tablet computer, handheld music and/or video player, personal data assistant (PDA), handheld game player, head-mounted display, heads-up display (HUD), global positioning system (GPS) receiver, an automotive navigation system, a dashboard, watch, microwave oven, automated teller machine (ATM), etc. A visual display device is one type of output device.

For purposes of the present invention, the term "water" refers to any type of water found in nature, contaminated or uncontaminated by pollutants, and water or any fluid that may be processed, treated, generated, produced, discharged, etc., by a water treatment system. For example, the term "water" may refer to wastewater collected by a wastewater collection system or to water being treated or processed by a water treatment facility for the distribution of potable drinking water to the public, or the term "water" may refer to effluent from an industrial plant, or sewage or wastewater processed or treated by a central wastewater treatment plant (WWTP). Thus, "water" may include any number of pollutants, solutes, sediments, suspensions, organic matter, etc., as the case may be.

For purposes of the present invention, the term "water flow logger" refers to a logger that records water flow of a water source. A water flow logger may be used to determine the rate of flow, level or velocity in a natural water flow such as a creek, stream, river, etc., or water flow in a man-made conduit such as a canal, pipe, weir, flume, sewer, etc.

For purposes of the present invention, the term "water quality" refers to any characteristic of water, including such characteristics as flow, velocity, level, conductivity, potability, turbidity, pH, dissolved solids, concentration of various impurities, concentration of various metals, concentrations of various ions, etc., for a water source or a water stream.

For the purposes of the present invention, the term "water source" refers to any source of water, either natural or man-made. Examples of water sources include oceans, gulfs, bays, lakes, rivers, streams, creeks, reservoirs, sewers, water tanks, water pipes, effluent from industrial plants, wastewater collection systems, wastewater treatment plants, etc.

For purposes of the present invention, the term "water stream" refers to any flow of water or waterway. Examples of water streams include natural flows of water such as a creek, stream, river, etc., or flows of water in a man-made conduit such as a canal, pipe, weir, flume, sewer, channel, etc.

For purposes of the present invention, the term "water system" refers to a water stream, a water source or combination of one or more water streams and/or one or more water sources. Examples of water systems include wastewater collection systems, sewer systems, wastewater treatment systems, etc.

For purposes of the present invention, the term "water treatment core facility" refers to a central facility that processes, treats, generates, etc., water in contrast to a broader collection or distribution system, such as a central wastewater treatment plant, for the processing or treatment of wastewater, or a water treatment facility, such as a facility for the generation of potable drinking water.

For purposes of the present invention, the term "water treatment system" refers to any system designed or used to process, treat or generate water or a water-based product for a particular application. A "water treatment system" may be used to generate water having a predetermined, desired, or preferred set of characteristics, qualities or properties, such as purity, etc. For example, a "water treatment system" may include a water treatment facility for generating and distributing potable drinking water for the public, a system designed to generate water for a manufacturing process, etc. In the case of a water treatment facility for generating potable drinking water, the water treatment system may further include a distribution system for distributing potable drinking water to the public. A "water treatment system" may also be any system used to process or treat a water-based substance into a product that may be discharged into the environment, such as a central WWTP, etc. In the case of a WWTP, the water treatment system may further include a collection system for collecting wastewater and funneling it into the central WWTP. Water treatment systems may include public or municipal systems or private systems dedicated to an industry, factory or particular real estate development. For example, a water treatment system may include any system, plant or facility that uses equipment based on advanced separation, filtration, dialysis, ion exchange processes or any other basis, technology or mechanism for processing, treating, detecting, purifying, isolating, separating, etc., water according to relevant parameters.

For purposes of the present invention, the term "web-enabled application" refers to an application that is run from the Web or Internet. A web-enabled application may be run within a web browser, may run on a web server, may output HTML for display on the Web, may launch a web browser to retrieve specific web page, etc.

For purposes of the present invention, the term "web server" refers to the conventional meaning of those terms, i.e., a computer that helps deliver content to another computer, a user, a visual display device, etc. that can be accessed through the Internet. In one embodiment of the present invention, a water quality monitoring system includes a communication server to interact with the remote loggers and samplers, a web server to display a user interface to an Internet browser, and a database server that does not have external access.

Description

Water quality monitoring systems often include sensors that measure the concentration of ions in the solution. The solution can be aqueous or organic in nature. One commonly monitored ion is the hydronium ion; however, any cation or anion can be of importance to a water quality monitoring system.

The quality of water is highly influenced by the concentration of hydronium ions ($H_3O^+$, or $H^+$), or pH, of the reaction environment. The pH of a solution is also often referred to as the acidity of the fluid being tested. By definition, pH=−log

[H$_3$O$^+$], or the negative log of the molar concentration of hydronium ions. On the pH scale, a very acidic solution has a low pH value, such as zero or one, corresponding to a large concentration of hydrogen ions (H$^+$). In contrast, a very basic solution has a high pH value, corresponding to a very small number of hydrogen ions (or to a correspondingly large number of OH$^-$ ions). A neutral solution, such as substantially pure water, has a pH value of about seven.

The presence of the correct concentration of acid in a solution can induce many forms of catalysis, such as, but not limited to, acetal formation, acetal hydrolysis, dehydration of alcohols, amide hydrolysis, epoxide ring opening, ester hydrolysis, esterification, ether formation and glycoside formation. The correct pH concentration can also include catalysis of hydration including, but not limited to, alkenes, alkynes, nitriles, nucleophilic acyl substitution and nucleophilic addition to aldehydes and ketones.

The pH of potable drinking water is a required reporting parameter of many governments, and effluent water pH ranges are strictly controlled. For example, in the United States the Environmental Protection Agency sets specific ranges for potable water discharge; if the water pH is outside the acceptable range, the water can be unsafe for human and animal consumption.

Water is also required for steam generation in nuclear reactors. The boilers of these nuclear reactors operate at extremely high temperatures that require a very high quality (purity) of water. It is critical that the process system is monitored properly to avoid expensive boiler cleanings and the associated downtime. Such systems may also include the need to monitor hazardous boiler chemicals, such as hydrazine, requiring highly qualified personnel. These examples highlight the importance of monitoring water supplies to not only ensure sufficient water quality, but also to avert costly equipment repair or replacement.

Water quality is also important for many manufacturing processes. For example, the manufacturing of semiconductors requires an ultra-pure water quality. Again, it is critical that the water supply is monitored properly to avoid latent defects in the manufacturing of products, such as semiconductors.

As yet another example, monitoring water quality is also important to avoid or lessen the consequences of equipment failure or deliberate tampering (such as by terrorist act) in contaminating the water supply. Adequate monitoring may help to catch any such contamination of the water supply to avoid harm and ensure that appropriate action is taken.

Embodiments of the present invention provide remote water sampler control with integrated predictive sampling. In some embodiments, the present invention provides a web-hosted application that allows for remote user control of one or more water samplers in combination with predictive sampling. In some embodiments, the present invention provides an integrated network of one or more water samplers and environmental sensors that allow for upstream samplers and/or data loggers to modify the sampling frequency of downstream samplers.

Various remote monitoring systems have been previously described. For example, U.S. Pat. No. 7,711,523 to Linley et al., entitled "System for remote monitoring and control of an instrument," issued May 4, 2010, the entire contents and disclosure of which are incorporated herein by reference, describes a web-based instrument and data management system and a method including software executing on an instrument controller computer system that receives a web file from web browsing software executing on a server. The web-based interface also extracts a user identifier and requested action, determines authorization, and performs the action. But Linley et al. does not describe a web-hosted application allowing control of a water sampler in combination with predictive sampling.

U.S. Pat. No. 3,719,081 to Lynn et al., entitled "Wastewater Sampler," issued Mar. 6, 1973, the entire contents and disclosure of which are incorporated herein by reference, describes a wastewater sampler. A water source of interest flows past a sampler, and an adjacent probe which develops and transmits to a remote control point a 4 to 20 milliamp signal, the amplitude of which is proportionate to the effluent rate. At the control point the signal is applied to an integrator which produces an output voltage proportionate to the quantity of effluent that has passed the probe in a preceding interval. Each time this voltage reaches a predetermined value a threshold circuit resets the integrator and pulses a first register to record the quantity of effluent for a given period, and simultaneously pulses a preset counter, which produces a sampler-enabling signal every time the counter reaches zero and resets. This enabling signal momentarily energizes a solenoid in a remote sampler to cause it to pump a sample of wastewater from the flume to a sample receptacle. But Lynn et al. does not describe a web-hosted application allowing control of a water sampler in combination with predictive sampling.

The publication "Hach Company Sigma 930T Literature No. 3467," the entire contents and disclosure of which are incorporated herein by reference, describes a remote communications flow meter. The Sigma 930T is a remote flow monitoring apparatus that monitors various parameters of a dynamic water source. The apparatus can continuously monitor data in real-time and provides for managing user-set alarms, level measurement, and Doppler-based flow measurement. The Sigma 930T logs information within the guidelines preset by the user. Applications include, but are not limited to, permanent collection system monitoring, long-term flow monitoring, sanitary sewer evaluation studies, and CSO and SSO studies and monitoring. But this publication does not describe a web-hosted application allowing control of a water sampler in combination with predictive sampling.

U.S. Pat. No. 5,646,863 to Morton, entitled "Method and apparatus for detecting and classifying contaminants in water," the entire contents and disclosure of which are incorporated herein by reference, describes a method and apparatus for detecting and classifying contaminants in water. The environmental monitoring system (EMS) described is designed to sample, detect, measure, and report in real-time the presence of contaminants and thereby provide users with the ability to continually monitor conformance of water with established health and safety standards. When integrated with a user-operated process control system, the EMS enables users to control the monitored process and thereby ensure that the sampled water complies with established health and safety standards. But this patent does not describe a web-hosted application allowing control of a water sampler in combination with predictive sampling.

Accordingly, there has not heretofore been described an apparatus and a method for a web-hosted application allowing control of a water sampler in combination with predictive sampling.

In one embodiment, the present invention provides a web-enabled predictive remote water quality monitoring system comprising: one or more remotely located environmental instruments in communication with one or more users through respective visual display devices that are in communication with one or more servers. The environmental instrument includes a predictive analysis module that allows the environmental instrument at one location to interpret the data and then send control commands to one or more environmental instruments at another location. The predictive analysis module may be hardware and/or software. The environmental instrument may send the environmental data to a remote user/visual display device via a remote server via a web-enabled browser.

In one embodiment, the present invention provides a web-enabled predictive remote water quality monitoring system in which a user can push programs to the remote environmental instrument via a web-enabled application.

In one embodiment, the present invention provides a web-enabled predictive remote water quality monitoring system that includes remote environmental instruments that include a predictive analysis module that is part of the remote environmental instruments or that is part of a server in communication with the environmental instruments. The predictive analysis module may be hardware and/or software.

In one embodiment, the present invention provides a web-enabled predictive remote water quality monitoring method that employs one or more remotely located environmental instruments in communication with one or more other remotely located sensors and/or a remotely located user/visual display device in communication with one or more remotely located servers. The environmental instruments may access a predictive analysis module that is part of the environmental instruments or that is part of a server in communication with the environmental instruments, and/or data from other environmental instruments, that allow for predictive analysis of events at one location to thereby control the environmental instruments at another site. The predictive analysis module may be hardware and/or software.

In one embodiment, the present invention provides a web-enabled predictive remote water quality monitoring method in which one environmental instrument can employ an instruction module that instructs a downstream environmental instrument to change its behavior based upon environmental conditions. The instruction module may be hardware and/or software.

In one embodiment, the present invention provides a web-enabled predictive remote water quality monitoring method in which a first environmental instrument can employ an instruction module that instructs a second environmental instrument in the same geographic region but not on the same water stream as the first environmental instrument to change its behavior based upon environmental conditions. The instruction module may be hardware and/or software. An example of a geographic region is a town, a valley, an area within a particular distance or radius, etc.

In one embodiment, the present invention provides a web-enabled predictive remote water quality monitoring method in which a remote user can push new programs via a web-enabled application via wireless communication to one or more environmental instruments, such as one or more loggers.

FIG. 1 shows a water quality monitoring system 100 that includes samplers 112, loggers 114 and sensors 116, i.e., environmental instruments. The one or more environmental instruments at a given location may be referred to as a "set of environmental instruments." In water quality monitoring system 100 data is transmitted via wireless bidirectional communication links 122. For example, there are respective wireless bidirectional communication links 122 between environmental instruments and server 124 and between server and remote user 132, such as an engineer, thereby allowing for a visual display of the data on a web-enabled browser on an interactive visual display device 134, i.e., a laptop computer.

By way of example, the remote user 132 may be interested in monitoring contaminant discharge 142, i.e., smokestack exhaust by an industrial site 144, i.e., a paper mill, and in monitoring contaminant discharge 146, i.e., oil and other pollutants, by an industrial site 148, i.e., an area where oil rigs are located. In this example, remote user 132 is located in a first location 162, i.e., Moscow, Russia; server 124 is located in a second location 164, i.e., Denver, Colo.; industrial site 144 is located in a third location 166, i.e., Vail, Colo.; and industrial site 148 is located in a fourth location, i.e., part of the Gulf of Mexico.

It would be impractical and expensive for remote user 132 to travel to the installation sites of each of the remote environmental instruments, i.e., samplers 112, loggers 114, sensors 116. Therefore, in one embodiment of the present invention the remote user 132 can push commands to one or more environmental instruments, such as samplers, loggers, sensors, etc. via a user control module of a web-enabled browser in combination with environmental instruments that contain executable software that allows for the environmental instruments to predict responses based upon environmental conditions.

For example, for a stream 168 flowing down a mountain 170 a logger 114 at upstream location 172 records a rain event upstream at an elevation of 14,000 feet. Sampler 112 at upstream location 172 may then execute the software that sends a wireless message 174 to sampler 112 at a downstream location 176 thus instructing sampler 112 at downstream location 176 to increase sample frequency, and/or a sampler 112 upstream may send a message via wireless communication link 178 to remote server 124 that in turn sends an alert as a wireless bidirectional communication link 122 to remote user 132 via a web-enabled browser on interactive visual display device 134. Remote user 132 may then use a user control module 180 of a web-enabled browser 181 on visual display device 134 to send commands to any number of the environmental instruments in the field based upon the data from a sampler 112 at upstream location 172.

For example, the remote user 132 may be interested in how rain events near third location 197, i.e., Vail, affect pH levels in a local pond 182 and how the rain events and pH levels affect local wildlife 184. If remote user 132 sees a spike in pH levels in the pond 182, then remote user 132 may push a reconfigured sampling setting via a web-hosted application by means of wireless bidirectional communication link 122, server 124 and wireless communication link 178 to sampler 112 at location 172, i.e., the sampler that is closest to snowpack 186 on mountain 170. Remote user 132 will be able to do so without leaving the comfort of his/her flat in Moscow at location 162. Or, if remote user 132 is unavailable, a predictive analysis module 188 of the system will allow for the downstream samplers, such as sampler 112 at downstream location 176 to capture the event data without remote user 132 being available.

Although the predictive analysis module is shown in FIG. 1 as being located in a server, the predictive analysis may be part of an environmental instrument such as a sampler, a logger or a sensor.

Also shown in FIG. 1, there is a wireless communication link 189 between logger 114 at location 172 and sampler 112 at industrial site 144. There is also a wireless communication link 190 between sampler 112 at downstream location 176 and server 124; a wireless communication link 192 between sensor 116 at a mountain top location 194 and server 124; a wireless communication link 196 between sampler 112 at location 197 and server 124; and a wireless communication link 198 between sampler 112 at downstream location 176 and sampler 112, logger 114 and/or sensor 116 at industrial site 144.

Although at most only one sampler, logger and sensor are shown at each location in FIG. 1, there may be two or more samplers, loggers and/or sensors at each location. In some embodiment, a user may use a user control module to communicate with a logger at a particular location that in turn communicate with one or more samplers and/or sensors at the location to allow the user to communicated with and control the one or more samplers and/or sensors. In some embodiments, the user control module may allow for direct communication with the samplers and/or sensors at a location and allow for control of one or more samplers and/or sensors at a particular location.

Although only one user, visual display device and server are shown in FIG. 1, the water quality monitoring system of the present invention may include multiple users, visual display devices and/or servers. Also, the number of potential different wireless communication links between various environmental instruments, servers, visual display devices, etc. may be virtually infinite.

Figure 2:
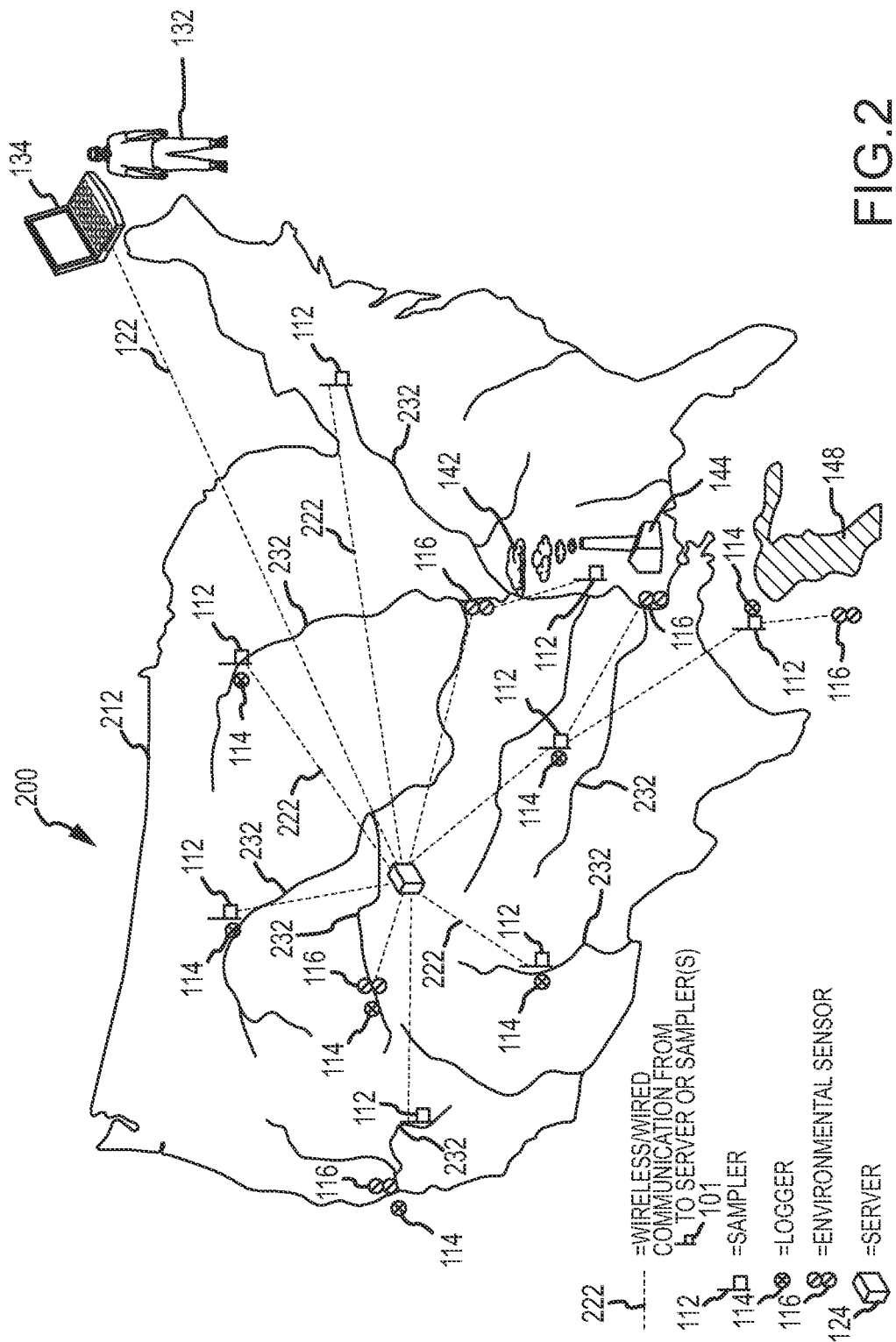
FIG. 2 is a schematic diagram illustrating a nationwide water quality monitoring system according to one embodiment of the present invention that includes the water quality monitoring system of FIG. 1.

FIG. 2 shows a nationwide water control monitoring system 200 that includes water control monitoring system 100. Water quality control monitoring system 200 includes additional sets of samplers 112, loggers 114 and sensors 116 at various locations around the United States 212. Wireless communications 222 are shown between samplers 112, loggers 114 and sensors 116 and server 124. Water control monitoring system 200 monitors river systems 232. Remotely located samplers 112 contain one or more executable predictive analysis programs that allow for event analysis and control of downstream environmental instruments.

Although only one server at one location is shown in FIG. 2, the water quality monitoring system may include multiple servers at one or more locations. Also, although only one user/visual display device is shown in FIG. 2, there may be multiple users/visual display devices that are in communication with the water quality control system.

Figure 3:
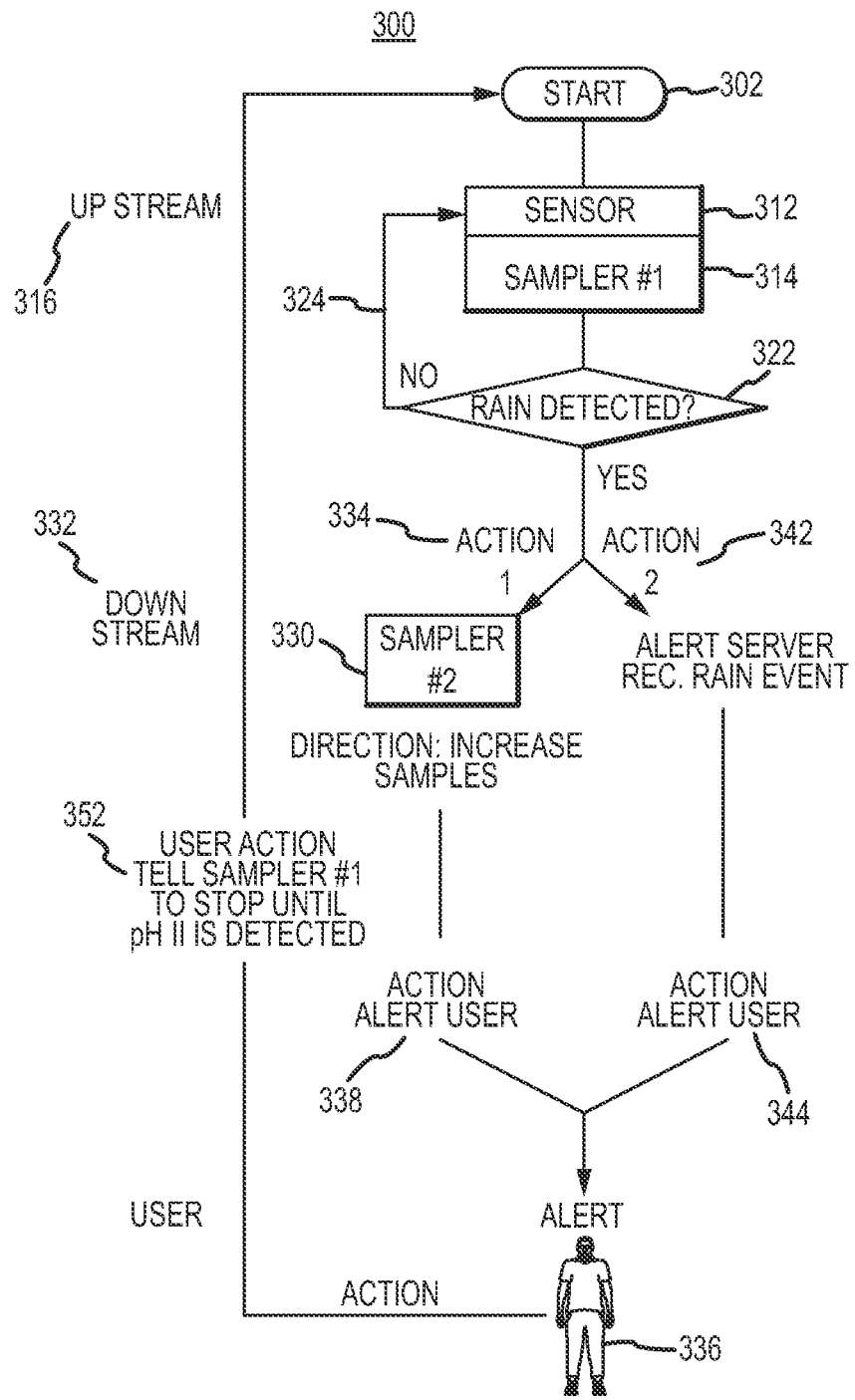
FIG. 3 is a schematic diagram illustrating a predictive method for modifying the operation of a downstream environmental instrument based on an event that is detected by an upstream environmental instrument.

FIG. 3 shows a predictive method 300 for modifying the operation of a downstream environmental instrument based on an event that is detected by an upstream environmental instrument. The method begins at step 302. An upstream sensor 312 and an upstream sampler 314 are located at an upstream location 316 on a stream of water. At step 322, upstream sampler 314 determines if an event, i.e., rain, is detected at upstream location 316 by upstream sensor 312. If no rain is detected at step 322 by upstream sensor 312, samples continue to be taken by upstream sampler 314 and monitored by upstream sensor 312 at the current rate at upstream location 316 as indicated by arrow 324. If rain is detected by upstream sensor 312 at step 322, upstream sampler 314 performs two actions.

A first action performed by upstream sampler 314 is to communicate with a downstream sampler 330 at a downstream location 332 and direct downstream sampler 330 to increase the number of samples taken at step 334. A remote user 336 is then alerted at step 338 that the first action has been taken. A second action performed by upstream sampler 314 is to communicate with the server to alert the server that a rain event has occurred at step 342. Remote user 336 is then alerted at step 344 that the second action has been taken. The second action may be performed before, after or simultaneously with the first action. Based on the alerts received by remote user 336, remote user 336 communicates with upstream sampler 314 and directs upstream sampler 314 at step 352 to stop taking samples until a pH of at least 11 is detected by a sensor (not shown) in a sample taken by downstream sampler 330 at downstream location 332. A pH of at least 11 may indicate a general change in environmental conditions.

Rain is detected by an upstream sensor/rain gauge connected to a logger or a sample. Rain may also be detected by a standalone rain logger/sensor. Other conditions that may be detected by an upstream sensor include level, velocity, flow or other water quality measurements such as conductivity, potability, turbidity, pH, dissolved solids, concentration of various impurities, concentration of various metals, concentrations of various ions, etc.

Although only one particular course of action by the remote user is shown in FIG. 3, the remote user may modify the behavior of any of the environmental instruments that are used in monitoring the stream of water. For example, the logging interval, the call interval, the sample interval, the program start/stop, the sample volume, etc., for an environmental instrument may be modified by the remote user.

Other predictive methods may allow a sample program to be initiated prior to the same sampler or logger detecting the event independently. Otherwise, the time frame of the event may be missed. For example, if the "resting" sampler interval is 60 minutes, this period may be too long and miss an event that happens 20 minutes into a particular interval of 60 minutes. The predictive methods may be useful in monitoring a wastewater collection system, monitoring compliance with environmental regulations and monitoring wastewater pretreatment.

Figure 4:
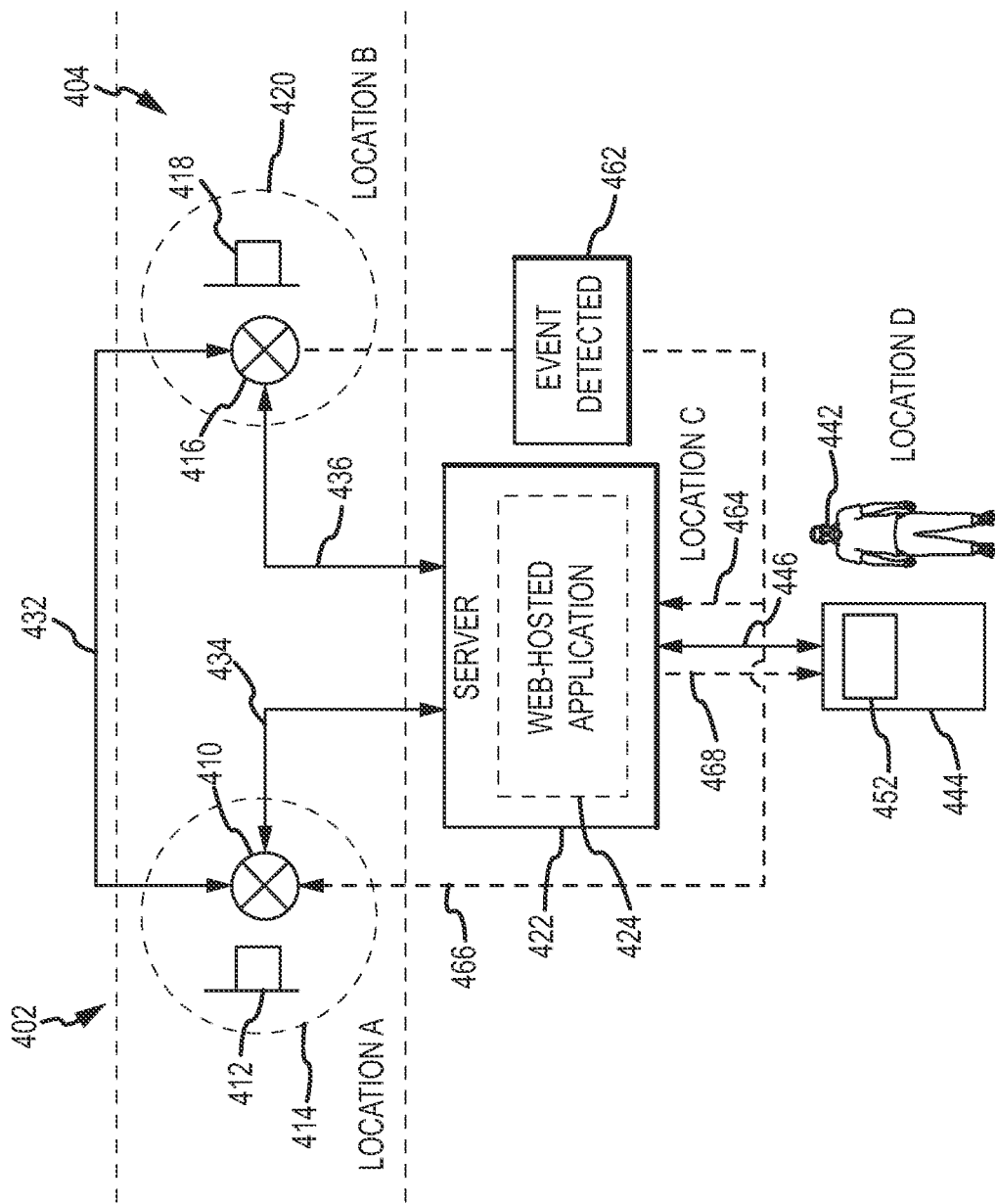
FIG. 4 is a schematic diagram illustrating a web-based water quality monitoring system according to one embodiment of the present invention.

FIG. 4 shows a web-based water quality monitoring system 402 for water system 404 such as a sewer system, a wastewater collection system, or a water treatment system. Water quality monitoring system 402 has two logger/sampler sets, i.e., logger 410 and sampler 412 mounted on a manhole 414 at location A, and a logger 416 and sampler 418 mounted on a manhole 420 at location B. Water quality monitoring system 402 also includes a server 422 at location C on which is hosted a web-hosted application 424. There is a bidirectional communication link 432 between logger 410 and logger 416. There is also a wireless bidirectional communication link 434 between logger 410 and server 422 and a wireless bidirectional communication link 436 between logger 416 and server 422. A remote user 442 at location D has a visual display device 444 that has wireless bidirectional communication link 446 with server 422. A display 452 of visual display device 444 allows remote user 442 to view a web-enabled browser that provides access to web-hosted application 424.

When an event 462 is detected by logger 416, logger 416 sends a wireless message 464 to server 422 and a wireless instruction 466 to logger 410. Based on wireless message 464, server 422 sends an alert 468 to visual display device 444. Based on wireless instruction 466, logger 410 changes its behavior and/or the behavior of sampler 412. Logger 416 may also change its behavior and/or the behavior of sampler 418 based on event 462. Based on alert 468, remote user 442 may also change the behavior of logger 410 and/or sampler 412 and/or logger 416 and/or sampler 418 by using a user control module of web-enabled browser displayed on visual display device 444 to control, via wireless bidirectional communication link 446, web-hosted application 424 that in turn can be used to control the behavior of logger 410 and/or sampler 412 and/or logger 416 and/or sampler 418.

The event of FIG. 4 may be a change in any type of water quality property such as a change in pH, a change in water flow, a change in water level, etc. The visual display device may be any type of visual display device such as a laptop computer, smartphone, etc.

Although in FIG. 4 the logger/sampler sets are mounted on respective manholes, logger/sampler sets may be mounted on other parts of a sewer system, wastewater collection system, water treatment system, etc.

An example of a web-hosted application that may be modified for use with embodiments of the present invention is the water quality management software FSDATA™ manufactured by Hach Company.

Many forms of electrochemical sensors may be used in the systems of the present invention to detect the presence and concentration of ions in water. For example, the carbon nanotube sensors described in U.S. patent application Ser. No. 12/952,392 to Salzer et al., entitled "Carbon Nanotube Sensor," filed Nov. 23, 2010, may be used in systems of the present invention and the entire contents and disclosure of this application are incorporated herein by reference.

Other sensors that may be employed in the systems of the present invention include the pH sensors described in U.S. Pat. No. 4,650,562 to Harman, and the entire contents and disclosures of this patent are incorporated herein by reference.

According to some embodiments of the present invention, examples of sensors that may be used with the remote water quality monitoring system may include any sensor known or used in the art. In addition to the variables listed above, the one or more sensors may be used to measure water level and/or flow velocity using any technology either known or later developed in the art. Such measurements may, for example, be used in combination to determine volumetric flow rate along with other known conditions and constants. For example, a sensor may also include a rain gauge. Examples of flow velocity or area flow velocity sensors that may be used with embodiments of the present invention may include wafer sensors and any sensor based on Doppler or ultrasonic, radar, pressure flow, electromagnetic (EM), magnetic (e.g., surcharge), etc., technology or detection. Examples of level, height or depth sensors that may be used with embodiments of the present invention may include any based on ultrasonic (look-down, submerged look-up, in-pipe, etc.), pressure (e.g., bubbler, surcharge, diaphragm displacement, etc.), radar, etc., technology or detection. According to some embodiments of the present invention, a height or level sensor may be combined with other structural elements or devices, such as flumes and weirs, to deduce other measurements or states, such as velocity in addition to water level, based on known relationships and constants. According to some embodiments of the present invention, any of the one or more sensors may further include an internal or external temperature sensor to provide, for example, auto correction for effects of temperature on any primary measurement by the sensor. According to some embodiments of the present invention, there may be a number of sensors at a particular location that obtain environmental data that may be jointly fed into an environmental instrument, such as a logger.

According to various embodiments of the present invention the one or more sensors detect or measure one or more of the following qualities of water in a water supply or water stream: temperature, chemical composition, total organic carbon (TOC), fluid quantity, flow rate, waste product, contaminant, conductivity, pH, dissolved oxygen, pressure, turbidity, permeate flow, chlorine or fluorine concentration, water or tank level, or equipment status or operation. The one or more sensors may be located at a plurality of locations within a particular geographic area.

According to some embodiments of the present invention, the one or more sensors may include any products on the market, sold, made by or branded under, for example, Hach™, Sigma™ or American Sigma™, Marsh-McBirney™, etc., either known or later developed in the art. Particular examples of the one or more sensors may include FLO-DAR®, FLO-TOTE®, FLO-MATE®, etc., sensors. For additional description of some types of sensors, see, e.g., U.S. Pat. Nos. 5,506,791, 5,633,809, 5,691,914, 6,208,943, 5,644,088, 5,811,688, 5,544,531, and 5,315,880, the entire contents and disclosures of which are incorporated herein by reference.

Electronic sensors may be used to detect or measure the amount of storage, discharge pressure and flow from a stream of water. Other parameters may be determined by analytical tests. Many of the sensors used to continuously monitor water streams are based on advanced separation processes employing ion-selective membranes which concentrate the analyte for detection. For example, detection of chlorine may be mediated via an ion-selective membrane which may readily and specifically pass an analyte, such as free chlorine or hypochlorous acid (HOCl), thus separating and concentrating the analyte from the bulk solution. The sensors may incorporate multiple sensors as part of a single detector unit.

According to some embodiments of the present invention, the only communication link between the server and the environmental instruments and remote users of the remote water quality monitoring system is a wireless communication link. Several benefits and advantages may be achieved by physically separating the storage, manipulation, analysis, reporting, etc., functions of the server and/or server database of the present invention from the site(s) or location(s) of data collection (i.e., sensors) within a remote water quality monitoring system.

According to some embodiments of the present invention, the server may be any type of computer, processor or device able to (1) at least temporarily collect, assemble, store, aggregate, etc., data from one or more sensors, and (2) transmit data or information to a server (or a server database associated with the server) via a mode of communication. Thus, a server may contain or include (1) a memory device(s) to collect, assemble, store, aggregate, etc., the data at least temporarily, (2) one or more ports or inputs for receiving data or information either directly or indirectly from one or more sensors, and (3) a transmission interface(s) to transmit data or information to a server. Such a server may further have the ability to process, manipulate, analyze, etc., the data obtained from the one or more sensors, such as by an analyzer or software located on the server, prior to transmission of data or information to the server and/or server database. The data sent from the server to the remote user/visual display device may be observational data synthesized from data derived from one or more environmental instruments.

According to some embodiments of the present invention, the logger may include one or more sensor ports for receiving data through cables, wires, etc., from one or more sensors. Alternatively, such a logger may be capable of receiving data wirelessly from one or more sensors. To store or log (at least temporarily) data or information received ultimately from the one or more sensors and/or manipulated or analyzed, the logger may include any type of memory device, such as a drive, flash or SIM card, etc. Thus, the logger may further include an analyzer or software to analyze or manipulate the data received from the one or more sensors. The logger may have a transmission interface, such as wireless connectivity or antenna or other connection outputs, for communicating via wireless transmission with a server.

According to some embodiments of the present invention, the analyzer may be one or more software programs on the server and/or the environmental instrument. Such an analyzer may perform analysis, calculation, comparison, manipulation, etc., of the data to generate an output, such as an analysis result, an analysis report, an alarm, etc., relevant to the monitoring of a stream of water, and the analysis, calculation, comparison, manipulation, etc., may be performed continuously, in real-time, at periodic or selected intervals, on condition or on demand. According to some embodiments of the present invention, an analyzer may be used to make calculations based on a combination of raw data from multiple sensors. When the analyzer is located on an environmental instrument, the analyzer may be used to generate or synthesize observational data derived from raw data obtained from a plurality of sensors. For example, independent data measurements of (1) flow rate and (2) water level by multiple sensors may be combined and used to calculate volumetric flow (in units of volume per time) based on the known dimensions and other constants regarding a water channel, pipe, etc., at a site within a water stream. Such multiple sensors used to measure volumetric flow may be connected to a common environmental instrument, such as a logger.

According to some embodiments of the present invention, the logger may have inputs, connectors or ports for one or more environmental instruments that may be automatically detected for plug-and-play options. The logger may be able to store or log data for a greater number of values or measurements than ports, such as up to 16 values. Each sensor port may receive data from a sensor comprising multiple individual sensors. The logger may have different power options, such as battery power, auxiliary (external) battery power, reusable source (e.g., solar panel, etc.) and/or power from the electrical grid which may be combined with power switching (i.e., using battery or auxiliary power as a backup). The logger may have additional inputs, connectors or ports for receiving auxiliary power or a data communication link for connecting to a user computer or laptop. The logger may also have a user interface for providing basic indications/information, such as device or sensor status, connections, etc. The logger may be water-tight, enclosed, and/or have a rugged construction, may contain a desiccant to control moisture within the device, and/or may include a means for mounting the device. An example of a flow logger may include any FLO-LOGGER® product known in the art.

According to some embodiments of the present invention, the data may be transmitted to the server via an electronic control system connected with or coupled to the one or more sensors using any suitable wireless mode of communication. For example, a section of ladder logic or function block program code may be inserted into the code base of the electronic control system which directs the electronic control system to send specified data to the server and/or database. The communications protocol may be any protocol that is supported by the electronic control system which facilitates the transmission. For example, RSLinx®, a software program from Rockwell Software, may be operative on the server database computer to facilitate the transmission by a programmable logic controller (PLC). Alternatively, any number of commercial communications drivers may be used, such as those produced by commercial providers such as Kepware®, Wonderware®, and so on. In the case of an electronic control system typified by SCADA® or HMI® products, such as Wonderware®, RSView®, WinCC®, and other similar products, code blocks may be added to the control code to allow the operating program to collect and send data to the server. Thus, the steps of collecting data locally, possibly storing it temporarily, and subsequently transmitting this data to a server may be incorporated into the electronic control system.

According to some embodiments of the present invention, the data may be transmitted to a server via a computer that is part of an environmental instrument, such as a sampler either directly or through an electronic control system connected to or coupled with the one or more environmental instruments. According to these embodiments, the environmental instrument may transmit the data acquired or collected directly or indirectly from the one or more sensors to the server by any suitable mode of wireless transmission.

According to some embodiments of the present invention, after the data and information obtained from the one or more environmental instruments have been sent to the server of the water quality monitoring system, the server may analyze or manipulate the data to generate an output, such as manipulated data, an analysis result, an analysis report, an alarm, etc. Alternatively, the environmental instrument may analyze or manipulate the data obtained from the one or more sensors and the data may then be transmitted to the server and the server may then further analyze or manipulate the data and information to generate an output. However, the output may be generated, presented, uploaded, etc., by the server without further analysis or manipulation by the server. The analysis, manipulation, etc., of the data may be performed by an analyzer, such as a software program or routine, firmware and/or hardware, that may be housed on the environmental instrument, the server and/or the server database associated with the server.

According to some embodiments of the present invention, the one or more sensors may be optionally integrated into or connected to an electronic control system. Examples of an electronic control system may include an in-house supervisory control and data acquisition system (SCADA) or a programmable logic controller (PLC). The electronic control system may be composed of any available commercial devices for converting analog to digital, such as analog-to-digital boards, specifically designed for the purpose of converting instrument readings or data to computer-readable form. Thus, the remote water quality monitoring system of the present invention may utilize existing instrumentation and control systems as well as existing communication devices. The electronic control system may perform basic analysis of the raw data to produce an analysis parameter that may then be sent to the server. According to some embodiments of the present invention, the electronic control system may continuously scan the sensor data and automatically log and archive the data at specified intervals. According to some embodiments of the present invention, raw data obtained from a sensor may be stamped or labeled with time and location information, such as a unique identifier, for aiding subsequent analysis or manipulation. Raw data obtained from a sensor may also be labeled according to the particular order in which the data are sent to a server. According to some embodiments of the present invention, the electronic control system may include a transmission interface which functions to transmit data to the server.

According to some embodiments of the present invention, a local configuration file on the environmental instrument may "tell" a program in the environmental instrument which of the register addresses of the electronic control system to access, any scaling factor that needs to be applied, a physical description of the data being collected, etc. The data set collected may then be converted into a form for transmission, such as a comma delimited string value, and perhaps be stored locally and possibly encrypted for security on a storage medium such as a hard disk, etc.

According to some embodiments of the present invention, the data and information obtained by an environmental instrument may be manipulated by a processor in the environmental instrument to generate an output, such as an analysis result, report, alarm, etc., that may be communicated to a user/visual display device via a server. Such data or information transmitted from an environmental instrument may include observational data which is calculated, manipulated, etc., by an analyzer on the environmental instrument from data derived from one or more environmental instruments. According to some embodiments of the present invention, the data and information may be analyzed, manipulated, etc., by analyzer(s) located on remote environmental instruments.

According to some embodiments of the present invention, a server database or software-implemented server database may be associated with the one or more servers for storage of data. The server database may be on the server or exist as a separate unit, and the number of server(s) and/or database(s) may be varied to suit a particular application, network traffic or demands of a particular client. According to some embodiments of the present invention, for example, the one or more servers may comprise a computer, an FTP server, a server database, and/or a web or Internet server, which may each be located at the same or different locations and use any available and appropriate operating systems. This storage on the server database may take many forms such as flat files, spreadsheets, and relational or non-relational databases. According to some embodiments of the present invention, the server database may be a relational database, such as Microsoft SQL Server or Oracle database products.

According to some embodiments of the present invention, the data may be wirelessly transmitted between the environmental instruments, the server(s) and/or the user/visual display device continuously, in real-time, at periodic or selected intervals, on condition, or on demand by a user. The data also may be encrypted for additional security and may be decoded by the server and/or the server database and placed in the appropriate locations.

According to some embodiments of the present invention, the data may be transmitted to the server by environmental instruments comprising the one or more sensors. According to these embodiments, the one or more environmental instruments may be fitted with communications processors which enable the sensors to send data directly to the server. Suitable environmental instruments may include sensor assemblies having a transmission interface effective for real-time data transmission, such as a LonWorks® network variable interface. Suitable sensors may also include, for example, the Six-CENSE™ and the CT-CENSE™, both manufactured by Dascore, Inc., as well as the multi-sensor devices manufactured by Sensicore, Inc. In this example, sensors may transmit the data to a server by any suitable wireless mode of communication, such as a cell network.

According to some embodiments of the present invention, data may be displayed or presented as an output, such as one or more analysis results and/or one or more analysis reports, in a predetermined format, which may then be sent to a user, such as, for example, a consumer, public official, authorized personnel or regulatory agency. Indeed, the data may be manipulated and formatted into an output or analysis report as required for submission to a regulatory agency. According to some embodiments of the present invention, the analysis or manipulation of data may be presented as an output that is uploaded onto a web server and made accessible via a web browser for presentation to, for example, a public official, consumer or interested member of the public. Alternatively, according to some embodiments of the present invention, an output in the form of an alarm may be sent to alert a user of a problem or deviation from normal conditions.

According to some embodiments of the present invention, one or more outputs may be sent, presented or uploaded to one or more remote viewing devices in one or more formats having different levels of sophistication or complexity based on their intended recipients or users, even if such one or more outputs relate to the same data or information. According to some embodiments of the present invention, an output, such as an analysis result or analysis report about current data, may be presented alongside and/or in comparison to historical records. An output may also be used to present scheduled and predicted maintenance reports. For example, the output may provide or present preconfigured performance information, maintenance, quality assurance, quality control, regulatory reports, cost reports, performance evaluation, graphing, historical trends, reports for plant or facility process, operating and economic information, indications and scheduling for preventive maintenance, troubleshooting, etc. According to some embodiments of the present invention, access to an output of the present remote water quality monitoring system may depend on the security measures in place, such as a login and password or other identifying criteria.

However, according to some embodiments of the present invention, a simplified presentation of the data in an output of the remote water quality monitoring system may be beneficial to even a trained remote user. Accordingly, a graphical and/or color-coded presentation of the data or analysis or manipulation of the data may potentially be used in any output format or report. A graphical presentation may include any suitable graphical format, such as tables, pie charts, bar graphs, etc., that may aid in the presentation of the output or report. Color coding may be used, for example, to provide an indication of normal or abnormal operation, as well as warning status or alarm conditions. An output of the remote water quality monitoring system may also show data or analysis or manipulation of the data in a geographical layout or form to help track or pinpoint the origin or cause of a problem. Historical data or expected values may also be shown with current data for comparison. When an output is provided to a trained remote user, the data and/or analysis may be presented as an exception report showing all instances in which data triggered an alarm or was close to a trigger point.

According to some embodiments of the present invention, when an output is sent or presented to management, the outputs or reports may be generated for three primary management levels: (A) process systems operations, (B) plant quality assurance (QA)/quality control (QC), and (C) financial oversight. For instance, an output or report for operations of a process system may contain information necessary to monitor, maintain, supervise and troubleshoot process plant system performance. In this manner, typical information and parameters may include, if applicable, flow rates, pressures, delta pressures, permeate and/or ion exchange quality, pH, alarm conditions, tank levels and a graphical presentation of applicable process performance parameters and trends.

According to some embodiments of the present invention, an output including data, analysis results, analysis reports, etc., may be sent to a remote viewing device using any appropriate or suitable wireless mode of communication. The output may be in any suitable file format, such as but not limited to html, jpeg, gif, pdf, etc., based on the output type and/or remote viewing device. The output may be sent in a suitable and/or tailored format to preselected recipients, such as authorized personnel, law enforcement and/or regulatory agencies, in the event of an emergency or abnormal condition or operation. The content of the output may be kept confidential, and access to the output, including data, analysis results, analysis reports, etc., may be controlled by encryption or the use of appropriate account names, protocols and passwords. Multiple parties or persons may be notified of, have access to, or receive outputs from, the remote water quality monitoring system, thus allowing redundancy in sending notifications, alarms, analysis results, analysis reports, etc.

According to some embodiments of the present invention, the wireless mode of communication for sending an output to, or allowing access to an output by, a remote viewing device may vary and may use any suitable technology. For example, according to some embodiments of the present invention, an output including data, analysis results, analysis reports, etc., may be uploaded to an Internet or a web server for access, visualization or downloading by a remote viewing device, such as by using a web browser. According to some embodiments of the present invention, the Internet server or web server may be the server of the remote water quality monitoring system or may be a separate computer or server. According to some embodiments of the present invention, the output may be uploaded to an Internet server or a web server for access with little or no manipulation or analysis by the server, visualization, or downloading by a remote viewing device by a user. According to these embodiments, for example, the data or information derived from the one or more sensors may first be analyzed or manipulated by the environmental instrument prior to being transmitted to the server. By making the output available on an Internet server or a web server, the communication or dispersion of the output, including data, analysis results, analysis reports, alerts, alarms, etc., may be greatly facilitated and may involve any interested or authorized recipients. For example, any authorized recipients may access data, analysis results, analysis reports, alerts, alarms, etc., of the output on a webpage by accessing the data, information, output, etc., asynchronously from the Internet server computer. Furthermore, the output, including data, analysis results, analysis reports, alerts, alarms, etc., may be continuously or regularly updated and made available in near-real-time.

According to some embodiments of the present invention, the wireless mode of communication for sending an output to, or allowing access to an output by, a remote viewing device may include other suitable technologies, such as, for example, by facsimile, file transfer protocol (FTP), voice or text messaging, text-to-voice telephone messages, electronic mail, pager, human voice calling, SMS messages, instant messaging or groupware protocols, the Internet, a cellular network, wireless or satellite communication, radio communication, etc. Examples of visual display devices that may be used by a remote user with various embodiments of the present invention may include, for example, personal computers, servers, etc., as well as a variety of personal communications equipment, such as PDAs, cell phones, pagers, BlackBerrys®, Palm® devices, iPhones®, etc. According to some embodiments of the present invention, the remote viewing device may be the same as the server of the present remote water quality monitoring system.

Another advantage of some embodiments of the present invention, for example, is the ability to send an output or other data, information, etc., about a water stream to a remote viewing device via a wireless mode of communication, which may reduce the need for operators or authorized personnel to visit the site of the water stream being monitored, maintained, etc. This may reduce the costs associated with monitoring a water stream if data had to be collected locally or by direct connection to a device or environmental instrument. This is especially true if the remote water quality monitoring system is further combined with sensors and other devices that require less maintenance and service, such as sensors that do not contact the water and are able to operate reliably for longer periods of time without maintenance or service.

According to various embodiments of the present invention, the wireless mode of communication between the environmental instruments and the server, between the environmental instruments at different locations, between the server and visual display devices at remote locations, etc., may vary and may be accomplished via one or more of the following: the Internet, TCP/IP, Ethernet, file transfer protocol (FTP), e-mail, SMTP, cellular phone networks, radios or remote terminal units (RTU) coupled to radio frequency transmitters, satellite transmission, a wireless network, a wide area network (WAN), a wireless local area network (WLAN), etc. According to some embodiments of the present invention, the data may be transmitted from the environmental instruments to the server continuously, in real-time, at periodic or selected intervals, on condition or on demand by a user.

Some of the embodiments of the present invention may be used to monitor a water treatment system. Such a water treatment system may comprise a water treatment core facility that is a water treatment facility for the distribution of potable drinking water to the public, and the water treatment system also may comprise a distribution system. According to some embodiments of the present invention, the water treatment system may comprise a water treatment core facility that is a WWTP, and the water treatment system may further comprise a collection system.

Municipal drinking water may be obtained from a variety of sources that can be made potable by use of proper water treatment equipment. For example, a reverse osmosis system may be used to lower the total dissolved solids from sea water with minimal pretreatment to produce potable drinking water. Despite the sophistication of pretreatment of seawater, improper monitoring or operation can allow the seawater to quickly foul membranes. If fouling occurs, but is found quickly, the membranes may be cleaned, and complex and costly water contamination and associated water treatment repairs may be averted. However, if the fouling is not detected quickly through proper monitoring, the membranes can be irreparably damaged, and expensive partial or total membrane replacement would be required. The cost of unplanned membrane replacement, not including the lost revenues typically associated with downtime, can make such a system cost prohibitive.

Increasingly, the need for pure water is causing more and more municipalities to install wastewater recovery processes to recycle municipal WWTP effluents back into water of suitable quality to be used for potable drinking water or irrigation. For example, such recovery processes may recover secondary treated municipal effluents using reverse osmosis, then inject the recovered effluents back into an aquifer. More and more of these installations are being planned throughout the United States and the rest of the world.

One difficult aspect of treating municipal wastewater effluent is that neither the flow rates nor the mix of contaminants is constant. This is particularly true for a municipal WWTP with collection systems that include a variety of industrial discharge sources in addition to the usual sanitary discharges from homes, businesses, schools, and so on. While the sanitary discharges are well characterized in terms of composition and treatability, the addition of industrial wastes means that the WWTP must plan for a wide variety of contaminants. In general, most WWTP systems cannot deal effectively with every situation. Even with excellent design and engineering, the large fluctuation in the type and quantity of contaminants reaching the WWTP often results in varying levels of effective treatment of the discharge from the WWTP. For a tertiary water recovery plant treating the effluent from the WWTP, this can be particularly difficult, because many contaminants are not readily removed even by processes such as reverse osmosis. In addition, certain contaminants can also foul reverse osmosis, ultrafiltration and microfiltration membranes, causing loss of performance or membrane damage. Therefore, it is important that wastewater treatment plants be monitored to ensure that contaminants are properly removed before discharge or reuse of effluents back into the environment to thereby avoid damage to expensive equipment.

Another application in which water quality is important is with wastewater treatment plants. The treatment and subsequent recycling of wastewater is a cornerstone of the quality of life in the industrialized world. Cities, industries and agricultural operations produce large quantities of wastewater, all of which must be treated to some degree to remove contaminants or pollutants before the water is suitable for recycling or discharge into the environment, such as streams, rivers or oceans. In metropolitan areas, central wastewater treatment plants must treat water from a variety of sources including city, industrial and agricultural wastewater. In many cases, generators of industrial wastewater are required to install and operate wastewater treatment plants at their own sites before discharge into central water collection systems. At the central water collection system, industrial wastes generally may be mixed with domestic or city wastewater and other untreated waste sources. These mixed wastes are then transported to the central wastewater plant or sewage treatment facility for final treatment before discharge.

Some embodiments of the present invention also provide a system and method for remotely monitoring, storing, analyzing, manipulating, uploading, reporting, etc., information and data relating to water quality and/or treatment derived from raw data obtained from a plurality of sensors of a water treatment system, which may be strategically placed to gather data or information necessary for analysis or manipulation. Such information and data may be remotely stored, manipulated, etc., on one or more servers, and/or stored on one or more removed databases, which may be associated with the one or more servers. A water treatment system, according to some embodiments of the present invention, may include any system designed or used to generate water or a water-based product having a predetermined, desired or preferred set of characteristics, qualities, properties, etc., for a particular application, such as, for example, a municipal potable drinking water treatment facility, a system generating water for a manufacturing process, etc., as well as any distribution system. A water treatment system may also include any system designed or used to process or treat a water-based substance into a product discharged into the environment, such as, for example, a central WWTP, etc., as well as any collection system. Water treatment systems may include public or municipal systems as well as systems dedicated to a real estate development. For example, a water treatment system may include any system, plant or facility that uses equipment based on advanced separation, filtration, dialysis, ion exchange processes or any other basis, technology or mechanism for processing, treating, detecting, purifying, isolating, separating, etc., water according to relevant parameters.

According to some embodiments of the present invention, the one or more sensors may be used to obtain relevant raw data about the operation of a water treatment system and/or the quality of water being processed, treated, received, distributed, etc., that would be relevant to the analysis, manipulation and evaluation of the data in generating an output, such as an analysis result, analysis report, alarm, etc. For example, each of the one or more sensors may be used to measure, quantify or detect the following characteristics, conditions, qualities, properties, etc., of water. Examples of characteristics, conditions, qualities, properties, etc., of water that may be measured by the one or more sensors may include, but are not limited to: temperature, chemical composition including total organic carbon (TOC), total suspended particles, quantity, flow rate, and types and amounts of waste(s) such as those commonly discharged into streams from wastewater treatment or industrial sites. Further examples of characteristics, conditions, qualities, properties, etc., of water that may be measured by the one or more sensors may include one or more contaminants, conductivity, pH, pressure, turbidity, permeate flow, dissolved oxygen, chlorine or fluorine concentrations, tank or water levels, and equipment status and operation. According to some embodiments of the present invention, the one or more sensors may be chosen to generate data or information for a regulatory report necessary to enable a regulatory agency to determine operational parameters and quality and quantity of the treated water such as water production rate (flow), treated water consumption rate (flow), treated water storage volume, reserve capacity (at current production and consumption rates), final treated water quality, reports and archive data for regulatory compliance and/or QA/QC QA/QC (quality analysis/quality control) documentation.

According to some embodiments of the present invention, raw data about the operation of a water treatment system or the characteristics, conditions, qualities, properties, etc., of water processed or treated by a water treatment system may be acquired, collected, detected, measured, etc., by one or more sensors or probes placed at one or more sites or locations within or throughout the water treatment system, such as a plurality of locations within or throughout the water treatment system, that may include locations in the field, i.e., in a collection or distribution system. Sensors may be strategically placed to gather relevant data and information at appropriate sites or locations and/or provide logical functional groupings for review and analysis.

According to some embodiments of the present invention, once the data is analyzed or manipulated into an output, such as an analysis result or analysis report, the output may be sent by any known, available and/or suitable wireless mode of communication from the server to a remote viewing device for viewing by a user. According to some embodiments of the present invention, the output may be sent to the remote viewing device or accessed by the remote viewing device continuously, in real-time, at periodic or selected intervals, on condition or on demand. For example, the output may be a notification, alarm or alert, such as an Alarm Event, sent on condition of an emergency or abnormal, harmful or dangerous quality, state or condition relating to a water stream. Such an output may include a notification of failures, shutdowns, exceeding of critical parameters, equipment damage, etc. Alternatively, for example, the output may be composed as an analysis report, which may be in a format for submission to a regulatory and/or law enforcement agency. The remote water quality monitoring system may send, present or upload an output as a weekly, monthly, yearly, etc., summary of performance, water quality or other information that may be reviewed by management for the water treatment system or by elected officials, customers, vendors or members of the public. Alternatively, the remote water quality monitoring system may send, present or upload an output continuously, on condition or on demand of a user. When sent or presented, the output may reflect or show updated information and recently collected data.

According to some embodiments of the present invention, the format and sophistication of the presentation of the output will likely depend on the intended recipient(s) or user(s). For example, an output, which may include any relevant information, data, analysis results, analysis reports, etc., about the operation of a water treatment system or the quality, properties, etc., of water processed or treated by the water treatment system, may be presented in a more sophisticated form when presented to internal management or operators of the water treatment system than when presented to elected officials, customers or members of the public.

According to some embodiments of the present invention, the output may be used to report or present information or analysis of the operation or conditions in a WWTP, particularly as the output relates to health and safety concerns. The analysis result may take many different forms; however, one form may be a prediction of the water composition and flow rate in terms of selected parameters of interest that may arrive at a WWTP as a function of time. Thus, for example, the server may be operable to calculate a predicted concentration of various components at the time of their arrival at a central WWTP and compare the computed values with pre-established and/or historical parameters.

According to some embodiments of the present invention, the output may be a report submitted to a regulatory agency in a required format, such as visual graphs, statistical reports or a compliance calendar, to meet the reporting requirements of the agency, and such reporting or sending of the output may be performed automatically. Quality and safety standards for potable water are regulated by the Environmental Protection Agency (EPA) in accordance with the Public Water System Supervision program. The standards are enforced by local agencies. There are over 170,000 water districts in the United States that provide public drinking water to 90% of Americans. The EPA issues primary standards designed to protect public health against substances that may be harmful to humans if consumed. EPA secondary standards ensure that aesthetic qualities of water, such as taste, odor or clarity, are met. However, each water district remains responsible for monitoring the drinking water itself to ensure that it meets all drinking water standards. The treatment processes for drinking water must be monitored as well. Therefore, the remote water quality monitoring system of the present invention may be useful not only in monitoring whether these standards are met on a routine and continuous basis, but also in providing automatic generation of regulatory reports as an output to an agency in the required format.

According to some embodiments of the present invention, the output of the remote water quality monitoring system may be a regulatory report sent to the Department of Homeland Security and/or law enforcement agencies in situations appearing to suggest deliberate tampering with a water treatment system, such as by an act of terrorism. Embodiments of the present invention may be able to carry out sophisticated calculations, manipulations, analyses, etc., to detect tampering events and perhaps distinguish those events from normal malfunction or mismanagement.

According to some embodiments of the present invention, the output may be in any format and may incorporate a tabular or graphical display as may be suitable to facilitate or focus the presentation of the data or analysis or manipulation of the data for a particular user. According to some embodiments of the present invention, the output of the remote water quality monitoring system may be a simplified presentation for a non-technical user who is untrained or lacks detailed knowledge about the operation of a water treatment system, such as a customer, elected official or member of the public. For example, municipal water treatment plants are ultimately the responsibility of elected officials. Yet these officials rarely have the technical training or time to allow them to directly access the performance parameters of the systems for which they are responsible. Embodiments of the present invention may easily be used to provide a readily understandable presentation output of the current performance of a municipal water treatment system. Such an output may be made accessible to the public, such as via the Internet by uploading onto a web page, thus allowing interested members of the public to monitor the operation of their own drinking water plants, as desired. In providing a simplified presentation of the data to the non-technical user, operating parameters may be color-coded and displayed graphically or in a tabular format, etc.

The presence or absence of turbidity in the water supply may greatly affect the amount of disinfectant required to achieve inactivation of biological organisms. The suspended particles producing turbidity are usually removed in the water treatment process before disinfection agents are applied. However, turbidity breakthroughs do occur, and failure to quickly raise the disinfection dose level may lead to insufficient disinfection residuals reaching the distribution system. This may present a threat to public health, particularly if the drinking water supply is contaminated either deliberately or inadvertently.

For example, in the context of a water treatment facility for providing potable drinking water to the public, data regarding disinfectant concentration and turbidity from both the treatment facility and the distribution system may be analyzed, and historical information as well as known constants may be used to predict expected conditions at points downstream within the distribution system based on expected lag times and the effluent conditions from the treatment facility. For example, data may be collected from the water treatment facility about relevant information, such as chemical dosing rates, filtered water turbidity, chlorine residual, etc., as well as data from sensors in the distribution system, such as chlorine residual, etc., may be used for comparison. With historical data as a reference point, one can calculate a chlorine demand from the chemical dose rates, flows and residual using the current data. Chlorine demand may be defined as the actual amount of chlorine that is reacting, typically calculated as free chlorine dosed less the residual chlorine. Chlorine demand may be correlated with temperature, season and filtered water turbidity. Additionally, residual chlorine leaving the plant may be correlated with residual chlorine within the distribution system. If the actual chlorine residual measured at the distribution system point of measurement varies from the historical values expected from the chlorine residual leaving the treatment facility by more than a set percentage or number of standard deviations, then an alarm or alert may be issued by the remote water quality monitoring system according to some embodiments of the present invention.

As another example in the context of a water treatment facility providing potable drinking water to the public, data obtained from the one or more sensors may be combined with known system constants such as flow rates, residence times and so on to continuously generate a calculated product of disinfectant concentration times contact time C*T. This simple factor alone is quite useful in predicting the amount of biological organism deactivation.

As another example in the context of a WWTP, an analysis or manipulation of data obtained from sensors at upstream locations in a collection system, such as sites or locations of discharge from water treatment or industrial wastewater plants, to detect the amount of contaminants or pollutants, may be used to predict the future composition and flow rate of water arriving at the central WWTP. This may be accomplished in a simple manner by using known or expected constants and information as well as historical records about transit time, flow rates and patterns, etc., from each of the relevant sites or locations upstream, such as within the collection system and at or near points of discharge. Any results, conclusions, reports, etc., generated using such an analysis or manipulation may be used to alert operators of a central WWTP receiving wastewater from the collection system of a potential overload so that appropriate precautions and changes in operation may be made. As will be readily appreciated by those skilled in the art of data analysis, this can provide a powerful indicator of either normal conditions expected at the WWTP or out-of-bounds conditions that may require immediate action and notification of responsible parties.

According to other embodiments of the present invention, the projected or remaining life of equipment, such as a membrane, may be determined or estimated by the remote water quality monitoring system based on operational performance data. Efficiency levels for equipment or a water treatment system as a whole may be determined by the remote water quality monitoring system relative to a theoretical potential or efficiency, which may be based on a theoretical minimum water, power and chemical consumption versus actual consumption calculated. In addition, financial and economic reports may be generated based on performance and/or consumption data. Furthermore, the data may be analyzed and compared to federal and/or state regulatory requirements for water quality and environmental protections.

A plant QA/QC output or report, for example, may contain information necessary to enable plant managers to effectively manage downstream manufacturing or distribution processes. In addition, quality assurance personnel may be able to monitor the quality and quantity of the treated water to confirm compliance with specifications and standards. Information in this report may typically include treated water production rate (flow), treated water consumption rate (flow), treated water storage volume, reserve capacity (at current production and consumption rates), final treated water quality, reports and archive data for regulatory compliance and/or QA/QC documentation.

Financial oversight may be achieved with a plant economic output or report that may contain information needed by managers with profit-and-loss or budget responsibility to effectively track the cost of operation and to identify budget variances when they occur, to permit timely corrective action. For this purpose, the data parameters contained in a plant economic report may include calculated power consumption (expressed in kWh and actual cost in local currency) that is computed on the basis of user's supply pump/motor efficiencies both as a year-to-date measurement and as a percentage of the prior period and variances both actual and budget/actual versus prior period. The parameters may also include calculated chemical consumption (expressed in volume consumption and as converted to local currency) and computed based on the user's supplied chemical dose rates and integrated feed water flow rates. This may be shown in the output or report as a year-to-date measurement, as a percentage of the prior period, or as variances of both actual and budget/actual versus prior period.

According to some embodiments of the present invention, an analyzer on the environmental instrument, the server and/or server database associated with the server may also interpret and consider any identifier(s) or configuration files associated with the data that may indicate or identify the origin, location and time of the data capture from the one or more sensors. The analysis and calculation of the data may further be performed by the analyzer to determine or indicate performance, evaluation, preventive maintenance, scheduling, optimization and troubleshooting of the operation of the water treatment system or equipment, in addition to monitoring water quality. For example, the data may be compared to known or expected performance data or parameters to calculate a differential, which may be used to determine whether the water treatment system is performing within a normal range or out of bounds if a predetermined differential is exceeded. Such comparisons may be based on the amount or concentration of, for example, a disinfectant, contaminant or pollutant present at different locations in a water treatment system. If the differential is exceeded, then appropriate persons, operators and/or agencies may be alerted. Alternatively, for example, the data may be compared to known, expected or historical data or values to determine if the operation of the water treatment system is optimized.

According to some embodiments of the present invention, the analyzer may convert the data into a consistent set of units, and thus translate all values into a common format, such as pounds per square inch (psi) for pressure, etc., using a unit's conversion sub-program to allow for appropriate comparisons and calculations. Furthermore, the data may be normalized to specific configurations and conditions for a water treatment system. For example, the feed pressure may be critical in determining the future and current performance of a system in reference to its performance when new. For reverse osmosis membranes, changes in pressure are related to age, production rate and temperature and vice versa. Thus, a change in flow rate may or may not indicate that the overall system's performance has changed when normalized and compared to its performance when new or recently cleaned. Prior to this invention, the complex mathematics for these conversions required some manual intervention on the part of the operator to compute the normalized conditions. Embodiments of the instant invention may do this automatically and report normalized data to the output.

According to some embodiments of the present invention, the analyzer or software of the present remote water quality monitoring system may be used to make any suitable statistical inferences, derivations, conclusions or predictions from the data, especially based on a comparison to historical data or expected values. Such an analysis or manipulation of the data may provide an indicator of either normal or abnormal operation of a water treatment system or characteristics, properties, qualities, etc., of water processed or treated by a water treatment system. According to some embodiments of the present invention, the analyzer may be used to predict conditions, such as the presence, quantity or concentration of a disinfectant, contaminant, or pollutant at a downstream location at a later point in time based on data obtained from sensors at upstream locations within a water treatment system.

According to some embodiments of the present invention, the data acquired or collected from the one or more sensors may be compared by the analyzer to expected or historical performance data or records and/or to any known values and constants, such as known or expected transit times, location-specific flow rates and patterns and distances within different portions of a water treatment system, known physical and chemical properties and characteristics of water, contaminants, disinfectants, pollutants, etc., using any known equations, algorithms, etc., which may be used to model, predict or compare the performance of the water treatment system or the quality of water processed or treated by the water treatment system. Data acquired or collected from the one or more sensors may be compared to each other and/or to historical data, and calculations may be performed to generate an output, such as one or more analysis results, etc. According to some embodiments of the present invention, the analyzer or software may perform any calculation, computation, comparison, analysis, etc., that would be relevant, suitable or appropriate to monitoring the operation of a water treatment system or the processing or treatment of water in a water treatment system.

One advantage of some embodiments of the present invention is that remote storage and manipulation of water quality and treatment data may make the operation of a water treatment system safer and less susceptible to tampering or control by unauthorized individuals or outsiders by separating the operation and control of the water treatment system from the data analysis, manipulation and/or communicating or reporting functions of the present invention. For example, this feature may be useful in detecting direct tampering, such as an act of terrorism, by an individual or outsider, with a water treatment system. According to some embodiments of the present invention, since the server of the remote water quality monitoring system is physically separated from the operation of the water treatment system, it is unlikely that an individual tampering with a water treatment system would also have access to the remote water quality monitoring system, especially since access to the remote water quality monitoring system may be controlled or password protected. According to some embodiments of the present invention, if a hacker were to remotely access the remote water quality monitoring system of the present invention, the hacker would not be able to directly access and control the operation of the water treatment system because the server and database are external, physically remote and not connected to the process facility being monitored, except perhaps via a wireless mode of communication.

Yet another advantage of some embodiments of the present invention is that data and information may be combined, pooled, compiled, etc., from sensors placed at multiple locations or sites throughout a water treatment system and in the field as part of a broader distribution or collection system. According to some embodiments of the present invention, sites or locations within the distribution or collection system may be considered part of the water treatment system, even though the distribution or collection system may operate independently of a water treatment core facility of the water treatment system. Such sensors located at the multiple locations or sites may operate independently and/or have no communication between sensors other than the remote water quality monitoring system of the present invention. By comparing data from these multiple independent sites or locations, a more advanced form of analysis and conclusions may be performed or made in view of the water treatment and distribution systems as a whole. For example, better prediction and anticipation of downstream contamination events may be made by having multiple data points obtained from sites or locations throughout a collection or distribution system associated with the water treatment system, thus allowing appropriate actions to be taken downstream to lessen or prevent the impact or damage caused by the contamination event, such as the introduction of dangerous, poisonous or unhealthful contaminants into the environment or drinking water.

For example, the water treatment core facility may be a central WWTP that receives waste released from multiple sources upstream that converge into a common collection system that feeds into the central WWTP. The collection system may serve numerous wastewater treatment sites or industrial waste sites that feed into a central WWTP. According to some embodiments of the present invention, multiple sensors may be placed throughout a collection system, including the water treatment and industrial waste sites, to monitor discharge into the common collection system. Water treatment sites may include cities, manufacturers, agricultural operations, etc., which treat wastewater before it is discharged into the common collection system. For a WWTP operator, an accurate prediction of the composition of incoming wastewater would be highly beneficial for the efficient operation of the WWTP facility.

According to some embodiments of the present invention, the composition of influx water in a WWTP serving a geographically distributed wastewater collection system may be estimated from measurements taken from sensors located upstream, such as at or near wastewater treatment sites or industrial waste sites discharging into the common collection system. Since the water flow patterns, water transit times and the composition of water leaving each of the treatment or industrial sites within the wastewater collection system may be known, the expected composition of influx water arriving at the WWTP can be calculated and reliably and quickly transmitted to the operators of the central WWTP and/or remotely to other entities or persons, such as through a remote viewing device. In addition to known information, the volumetric flow rate may be measured using the one or more sensors. This advance notice allows the WWTP to respond to varying contaminant or pollutant introductions in a far more effective manner than at present, where the first knowledge or information may come after the contaminants have already entered or even passed through the system. For WWTP entities that operate reclamation facilities downstream of the WWTP, this advance knowledge is even more valuable, because it allows the reclamation facility to modify its operations as necessary to prevent damage to the process facilities. It will be readily appreciated by WWTP operators that knowledge of the incoming wastewater composition would be of great benefit in assuring the continued operation of the central facility at top efficiency.

One advantage of some embodiments of the present invention is that the remote water quality monitoring system of the present invention may create a layer of redundancy that may be independent of and/or complementary to the direct monitoring carried out by qualified individuals at a water treatment system or facility to safeguard operation of the water treatment system. Redundancy may also be achieved by, perhaps simultaneously, reporting analyzed or manipulated data to multiple persons and/or entities in the same or different format. In addition, the remote water quality monitoring system may reduce or eliminate the need for direct human involvement. By having the remote water quality monitoring system automatically perform the calculations and manipulations on the raw data in real-time without direct human involvement, there may be less human error in evaluating, analyzing, etc., water quality and the operation of the water treatment system.

Another possible advantage of some embodiments of the present invention is that the data may be transmitted to a server where more advanced computations, manipulations, analysis, etc., may be performed prior to reporting, uploading, etc., an output, such as an analysis result, analysis report or alarm, to a user. A software program on the server may be more sophisticated than may be achieved locally, such as with the local electronic control systems used to control and operate the water treatment system, plant or facility. This may allow for the processing power of existing control systems to not be impaired or impacted. For example, an analysis report generated by manipulation of the data on a server may include a submission to a regulatory agency to meet reporting requirements in the format required by the agency, and such reporting may be performed automatically. The remote analysis, manipulation, etc., may be performed quickly and automatically to remotely monitor operation and water conditions in real-time, continuously, at selected, periodic or regular intervals, on condition or upon demand of a user and rapidly generate multiple types of outputs, such as alarms, analysis results, analysis reports, etc., to one or more users. For example, the software program may separately generate a detailed regulatory report for submission to a regulatory agency, send a simple alarm to authorized personnel to alert of a contamination or equipment failure, and/or post data and information about the water treatment system on a web page for access by members of the public. Alternatively, the analysis, manipulation, etc., of data and information may be performed locally on the environmental instrument, such as a logger. According to some embodiments of the present invention, such analysis, manipulation, etc., of data and information on the environmental instrument may be performed in addition to further analysis, manipulation, etc., of data on the server.

Yet another advantage of some embodiments of the present invention is that greater flexibility and accessibility may be achieved over existing systems by allowing a user access to the server to receive data, information, reports, etc., sent by any known means or wireless mode of communication from the server. By having greater accessibility and communication of data, information, reports, etc., greater coordination may be achieved between different parts of the water treatment system and any associated collection or distribution system, which may include, for example, remote sites or locations of industrial waste discharge in the case of a WWTP.

Yet another advantage of some embodiments of the present invention is that the remote water quality monitoring system may be implemented with moderate cost, because the remote water quality monitoring system may be incorporated or interfaced with existing sensors and/or an electronic control system of a water treatment system without modification of the design or layout of the water treatment system. Furthermore, the data collected from the water treatment system may be transmitted electronically to the server using, for example, existing communication networks.

Another advantage of some embodiments of the present invention is that the cause, scope or location of a problem or source of contamination may be better determined, tracked or distinguished by having more independent data points of reference obtained from sensors at sites or locations throughout a water treatment system, such as sites or locations in a water treatment core facility as well as throughout a collection or distribution system, i.e., in the field. Such analysis or determinations may be aided by the existence of historical data and known information about the operation of the water treatment system in relation to its environment which may be used for comparison. For example, a chemically or biologically active agent may be deliberately injected into the distribution system at a point downstream of a potable drinking water treatment facility. A sophisticated terrorist might first inject a chlorine scavenger, such as sodium metabisulfite, into the distribution system to eliminate the residual chlorine normally present. At some point downstream of the metabisulfite injection point, the chemical or biological agent could be injected into the water without destruction by any residual disinfectant. Without a remote water quality monitoring system in place with sensors in the distribution system, such contamination could go undetected for quite some time, allowing a thorough infiltration of a biological or chemical agent throughout the distribution system. By contrast, the remote water quality monitoring system could detect that the residual chlorine at the sensor had diminished to zero and sound the alarm. Especially with historical data available for comparison, the remote water quality monitoring system would be able to reduce the incidence of false terrorist attack alarms because data obtained from sensors at the treatment facility and in the distribution system could be compared. For example, a chlorine-dosing equipment failure might be determined and distinguished from a terrorist attack if a decrease in chlorine concentration is observed at both the water treatment plant and at points in the distribution system.

In the claims, unless specified otherwise, steps of a method may be performed in any order. For example, in a method claim, step (b) may be performed before step (a), unless the language of the claim requires that step (a) be performed prior to step (b).

Having described many embodiments of the present invention, it will be apparent that modifications, variations, alterations and changes are possible without departing from the full scope of the invention as defined in the appended claims, and equivalents thereof. It should be appreciated that all examples in the present disclosure, while illustrating many embodiments of the invention, are provided as non-limiting examples and are, therefore, not to be taken as limiting the various aspects so illustrated.

What is claimed is:

1. A system comprising:
a plurality of sets of environmental instruments located at a plurality of respective locations, each set of environmental instruments comprising one or more environmental instruments at one of the respective locations,
one or more visual display devices for displaying environmental data from the selected one or more environmental instruments,
one or more servers in wireless communication with the plurality of sets of environmental instruments and the one or more visual display devices,
wherein each of the environmental instruments measure water quality for a water stream at the location of the environmental instrument, and
wherein the plurality of sets of environmental instruments comprise a first environmental instrument at a first location, a second environmental instrument at a second location, and a third environmental instrument at the first location,
wherein the first environmental instrument controls the second environmental instrument based on water quality measured by the first environmental instrument or the third environmental instrument,
wherein the plurality of environmental instruments are in communication with the one or more visual display devices via the one or more servers,
wherein the one or more servers comprise a web-enabled application for displaying water quality data measured by the plurality of sets of environmental instruments on the one or more visual display devices,
wherein the one or more visual display devices are each located remotely with respect to the plurality of sets of environmental instruments, and
wherein the one or more servers are located remotely from the plurality of sets of environmental instruments and the one or more visual display devices.

2. The system of claim 1, wherein at least one of the servers displays the environmental data from one of the one or more environmental instruments in a web browser on at least one of the one or more visual display devices.

3. The system of claim 1, wherein the one or more servers push programs to one or more of the environmental instruments based on a request from a user, and wherein the one or more programs control the one or more environmental instruments.

4. The system of claim 1, wherein the plurality of sets of environmental instruments measure water quality data for a plurality of water streams.

5. The system of claim 1, wherein the one or more environmental instruments comprise a sampler.

6. The system of claim 1, wherein the one or more environmental instruments comprise a logger.

7. The system of claim 1, wherein the first environmental instrument controls the second environmental instrument based on water quality measured by the first environmental instrument.

8. The system of claim 1, wherein the first environmental instrument controls the second environmental instrument based on water quality measured by the third environmental instrument.

9. The system of claim 1, wherein each of the environmental instruments measure a water quality for a water stream at the location of the environmental instrument selected from the group of characteristics consisting of ion concentration, turbidity, potability, pH, dissolved solids, concentration of impurities, and conductivity.

10. The system of claim 9, wherein the water quality characteristic includes ion concentration.

11. The system of claim 9, wherein the water quality characteristic includes pH.

12. The system of claim 9, wherein the water quality characteristic includes turbidity.

13. The system of claim 9, wherein the water quality characteristic includes dissolved solids.

* * * * *